US012699335B2

(12) United States Patent
Ookubo et al.

(10) Patent No.: US 12,699,335 B2
(45) Date of Patent: Aug. 4, 2026

(54) CORE-SHELL PARTICLE, AND TONER

(71) Applicant: CANON KABUSHIKI KAISHA, Tokyo (JP)

(72) Inventors: Kenji Ookubo, Shizuoka (JP); Keisuke Adachi, Tokyo (JP); Shintaro Noji, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 494 days.

(21) Appl. No.: 18/324,840

(22) Filed: May 26, 2023

(65) Prior Publication Data

US 2023/0384705 A1 Nov. 30, 2023

(30) Foreign Application Priority Data

May 31, 2022 (JP) ................................ 2022-088684

(51) Int. Cl.
*C08L 83/04* (2006.01)
*G03G 9/097* (2006.01)

(52) U.S. Cl.
CPC .......... *G03G 9/09775* (2013.01); *C08L 83/04* (2013.01); *G03G 9/09733* (2013.01); *C08L 2207/53* (2013.01)

(58) Field of Classification Search
CPC ........... G03G 9/09775; G03G 9/09733; C08L 83/04; C08L 2207/53
See application file for complete search history.

(56) References Cited

U.S. PATENT DOCUMENTS

2018/0275575 A1* 9/2018 Uchida .............. G03G 9/08797
2018/0329323 A1* 11/2018 Kimura ................ G03G 9/0825

FOREIGN PATENT DOCUMENTS

| | | | |
|---|---|---|---|
| JP | H08292599 | A | 11/1996 |
| JP | 2018159883 | A | 10/2018 |
| JP | 2018189954 | A | 11/2018 |
| JP | 2018194614 | A | 12/2018 |
| JP | 2018205385 | A | 12/2018 |

* cited by examiner

*Primary Examiner* — Mark F. Huff
*Assistant Examiner* — Charles Collins Sullivan, IV
(74) *Attorney, Agent, or Firm* — Canon U.S.A., Inc. IP Division

(57) ABSTRACT

A core-shell particle includes a core, and a shell on a surface of the core. The core includes a crystalline release agent. A value of a sum of a number-average value of Feret diameter of the core-shell particle and a standard deviation of the Feret diameter of the core-shell particle is 20 to 500 nm. The shell comprises an organosilicon polymer. In a differential scanning calorimetric measurement of the core-shell particle, a maximum endothermic peak is present when a temperature is raised from 30° C. to 120° C. at 10.0° C./min, a maximum exothermic peak is present when the temperature is lowered from 120° C. to 30° C. at 10.0° C./min, and Tc (° C.) is at least 5° C. lower than Tm (° C.) where Tm is a peak temperature of the maximum endothermic peak and Tc is a peak temperature of the maximum exothermic peak.

11 Claims, 1 Drawing Sheet

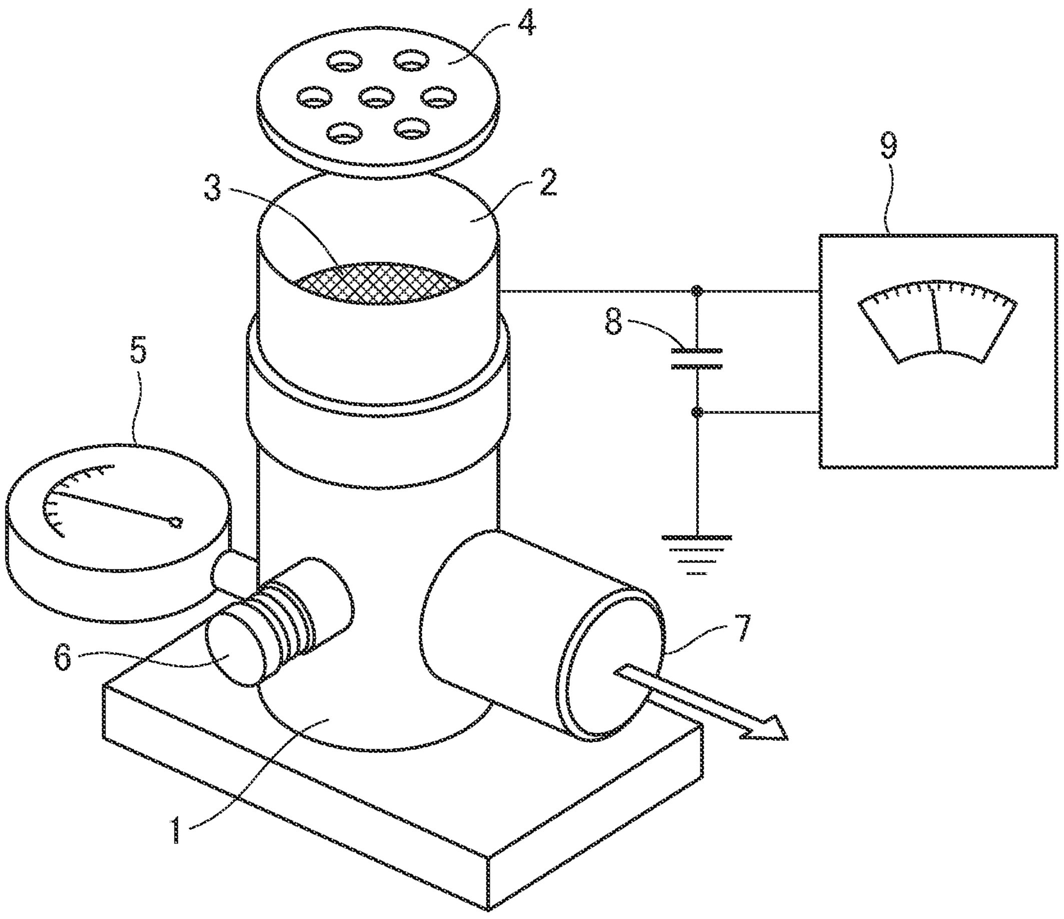
4
9
3
2
8
5
7
6
1

CORE-SHELL PARTICLE, AND TONER

BACKGROUND OF THE INVENTION

Field of the Invention

The present disclosure relates to a core-shell particle, and to a toner that uses this particle as an external additive and is used in recording methods that utilize, for example, electrophotographic methods.

Description of the Related Art

Image-forming devices, e.g., copiers, printers, and so forth, have been subject in recent years to an increasing diversification of intended applications and use environments, and in combination with this have been subject to demands for higher speeds and longer life. A large number of means are known with regard to image-forming methods, but among these electrophotographic methods are one of the main technologies. The process in electrophotographic methods proceeds as follows. First, an electrostatic latent image is formed, by any of various means, on an electrostatic image bearing member (also referred to hereafter as the "photosensitive member"). A visible image is provided by carrying out development of this latent image using a developer (also referred to hereafter as "toner"), and as necessary the toner image is transferred to a recording medium, e.g., paper, and the copied article is then obtained by fixing the toner image on the recording medium by the application of, e.g., heat or pressure. When, in particular, a procedure of melt-adhering the toner image to the recording medium using a heated roller is employed when the toner image on the recording medium is fixed, a procedure is known wherein a release agent is incorporated in the toner particle in order to prevent melt-adhesion of the toner to the roller.

However, when the release agent is incorporated in the toner particle, release agent that can contribute to release by outmigrating to the toner surface during fixing constitutes only a portion of the total release agent content, while the remainder stays within the toner particle without contributing to release. In particular, as higher speeds are implemented, the time for the fixing process is shortened and because of this the proportion of the release agent that can contribute to release by outmigrating to the toner surface during fixing becomes smaller. As a consequence, the toner particle must contain greater amounts of release agent in order for higher speeds to co-exist with an acceptable release performance.

When, on the other hand, a large release agent content is provided, member contamination caused by the release agent is produced in association with use for an extended period and reductions in image quality are then readily produced. That is, a portion of the toner is cracked by the stresses associated with toner/member rubbing and the incorporated release agent is then exposed and adheres to members, thus causing a reduction in image quality, e.g., image streaks. The stress applied to the toner also increases in association with increases in the speed, and achieving both higher speeds and longer life has thus been disadvantageous. Art has therefore been proposed that provides a large value for the proportion of release agent that can outmigrate to the toner surface during fixing.

Japanese Patent Application Laid-open No. 2018-159883 discloses art that, by locating the release agent in the vicinity of the toner surface, facilitates outmigration by the release agent to the toner surface. Japanese Patent Application Laid-open No. H08-292599 discloses art in which release agent is embedded in the toner surface and a silane coupling agent film is formed at the toner surface. Japanese Patent Application Laid-open No. 2018-189954 discloses a toner that has a core-shell external additive, i.e., an external additive in which the core is a release agent and the surface layer is coated with an organosilicon polymer shell. A methacryloyl group-bearing organosilicon compound is used for the organosilicon polymer.

The total release agent content can be reduced in accordance with Japanese Patent Application Laid-open No. 2018-159883. However, the occurrence of member contamination caused by the release agent is also facilitated by locating the release agent at the toner surface, and because of this a satisfactory co-existence between higher speeds and longer life is not achieved.

According to Japanese Patent Application Laid-open No. H08-292599, volumetric compression associated with toner particle deformation is required for the release agent embedded in the toner surface to break through the silane coupling agent film and exude to the outside. Due to this, exudation of the release agent is impeded in the temperature region where there is little toner particle deformation in the early stage of the fixable temperature. That is, notwithstanding the positioning of the release agent in the vicinity of the toner surface, large amounts of release agent must be used to obtain a satisfactory release performance beginning with the early stage of the fixable temperature.

According to Japanese Patent Application Laid-open No. 2018-189954 enables the release agent to be located at the toner surface and also enables a suppression, through the organosilicon polymer shell, of the member contamination that accompanies release agent exposure. In addition, when the release agent forming the core is melted, a pressure that causes rapid exudation to the outside is then applied to the organosilicon polymer shell accompanying deformation of the core, and due to this outmigration of the release agent can be brought about independently of the fixation temperature of the core.

However, at least a certain pressure is required in order for the release agent in the interior of the external additive to exude out during fixing, and external additive that can contribute to release is limited to external additive where a satisfactory pressure is applied. In addition, a strong organosilicon polymer shell is required in order to enhance the durability, and as a result the proportion of external additive that can contribute to release is diminished still further. In view of these considerations, there is room for improvement with regard to the effectiveness as a release agent.

SUMMARY OF THE INVENTION

The present disclosure provides a core-shell particle that enables exudation of the release agent to the outside even at lighter pressures and is thus highly effective as a release agent. The present disclosure also provides a toner that uses this core-shell particle as an external additive.

The present disclosure relates to a core-shell particle comprising a core, and a shell on a surface of the core, wherein: the core comprises a crystalline release agent; a value of a sum of a number-average value of Feret diameter of the core-shell particle and a standard deviation of the Feret diameter of the core-shell particle is 20 to 500 nm; the shell comprises an organosilicon polymer; and in a differential scanning calorimetric measurement of the core-shell particle, a maximum endothermic peak is present when a temperature is raised from 30° C. to 120° C. at 10.0° C./min, a maximum exothermic peak is present when the temperature is lowered from 120° C. to 30° C. at 10.0° C./min, and Tc (° C.) is at least 5° C. lower than Tm (° C.) where Tm is a peak temperature of the maximum endothermic peak and Tc is a peak temperature of the maximum exothermic peak.

Another embodiment of present disclosure relates to a core-shell particle comprising a core, and a shell on a surface of the core, wherein: the core comprises a hydrocarbon wax; a value of a sum of a number-average value of Feret diameter of the core-shell particle and a standard deviation of the Feret diameter of the core-shell particle is 20 to 500 nm; the shell comprises an organosilicon polymer; and in a differential scanning calorimetric measurement of the core-shell particle, a maximum endothermic peak is present when a temperature is raised from 30° C. to 120° C. at 10.0° C./min, a maximum exothermic peak is present when the temperature is lowered from 120° C. to 30° C. at 10.0° C./min, and Tc (° C.) is at least 5° C. lower than Tm (° C.) where Tm is a peak temperature of the maximum endothermic peak and Tc is a peak temperature of the maximum exothermic peak.

Another embodiment of present disclosure relates to a core-shell particle comprising a core, and a shell on a surface of the core, wherein: the core comprises a hydrocarbon wax; a value of a sum of a number-average value of Feret diameter of the core-shell particle and a standard deviation of the Feret diameter of the core-shell particle is 20 to 500 nm; the shell comprises an organosilicon polymer; and the organosilicon polymer comprises a structure given by a following formula (RT3)

$$R\text{—}SiO_{3/2} \qquad \text{(RT3)}$$

wherein R in formula (RT3) represents an alkyl group having 1 to 6 carbons.

The present disclosure can provide a core-shell particle that enables exudation of the release agent to the outside even at lighter pressures and is thus highly effective as a release agent. Further features of the present disclosure will become apparent from the following description of exemplary embodiments with reference to the attached drawings.

BRIEF DESCRIPTION OF THE DRAWINGS

The FIGURE is a schematic diagram of an instrument for measuring triboelectric charge quantity.

DESCRIPTION OF THE EMBODIMENTS

Unless specifically indicated otherwise, in the present disclosure the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination.

The present disclosure relates to a core-shell particle comprising a core, and a shell on a surface of the core, wherein: the core comprises a crystalline release agent; a value of a sum of a number-average value of Feret diameter of the core-shell particle and a standard deviation of the Feret diameter of the core-shell particle is 20 to 500 nm; the shell comprises an organosilicon polymer; and in a differential scanning calorimetric measurement of the core-shell particle, a maximum endothermic peak is present when a temperature is raised from 30° C. to 120° C. at 10.0° C./min, a maximum exothermic peak is present when the temperature is lowered from 120° C. to 30° C. at 10.0° C./min, and Tc (° C.) is at least 5° C. lower than Tm (° C.) where Tm is a peak temperature of the maximum endothermic peak and Tc is a peak temperature of the maximum exothermic peak.

The present inventors discovered that, by setting up a structure as described above, a core-shell particle can be provided that enables the exudation of release agent to the outside even under light pressure, such as that during fixing, and that is thus highly effective as a release agent. The reasons for this are considered to be as follows.

In differential scanning calorimetric measurement (DSC measurement) using the core-shell particle as sample, an endothermic peak during temperature ramp up indicates melting of the crystalline release agent contained in the core. The subsequent exothermic peak during temperature ramp down represents freezing of the melted release agent. For the same substance, melting and freezing occur at the same temperature, but in actual measurements the melting temperature is observed to the higher side and the freezing temperature is observed to the lower side; this results from the timing with regard to the signal response of the DSC measurement device.

When DSC measurements are performed using the condition of 10° C./min for the ramp up rate and ramp down rate, the freezing temperature is observed at 2 to 3° C. lower than the melting temperature. When the freezing temperature here becomes 5° C. or more lower than the melting temperature, it is thought that the crystalline release agent has compatibilized with the organosilicon polymer shell upon melting and freezing point depression is then produced. For example, upon exposure to high temperatures, e.g., during fixing, it is thought that, due to compatibilization between the crystalline release agent and organosilicon polymer shell, the shell softens and the particle is then easily deformed, and in combination with this the melted release agent can readily exude to the outside from regions where compatibilization has progressed.

The release agent here indicates a substance for which the kinematic viscosity at 110° C. is not greater than 100 $mm^2/s$. It is thought that a release agent having such a kinematic viscosity readily flows out to the outside during fixing from regions of compatibilization with the organosilicon polymer shell and that the release agent can exude out even at light pressures.

In addition, the value (also referred to hereafter as the "maximum Feret diameter") of the sum of the number-average value of the Feret diameter of the core-shell particle and the standard deviation thereof is 20 to 500 nm. Having the maximum Feret diameter be at least 20 nm makes it possible to encapsulate the amount of release agent required for compatibilization; having the maximum Feret diameter be not more than 500 nm makes it possible to form an organosilicon polymer shell with the strength required to provide an improved durability.

Another embodiment of present disclosure relates to a core-shell particle comprising a core, and a shell on a surface of the core, wherein: the core comprises a hydrocarbon wax; a value of a sum of a number-average value of Feret diameter of the core-shell particle and a standard deviation of the Feret diameter of the core-shell particle is 20 to 500 nm; the shell comprises an organosilicon polymer; and in a differential scanning calorimetric measurement of the core-shell particle, a maximum endothermic peak is present when a temperature is raised from 30° C. to 120° C. at 10° C./min, a maximum exothermic peak is present when the temperature is lowered from 120° C. to 30° C. at 10.0° C./min, and Tc (° C.) is at least 5° C. lower than Tm (° C.) where Tm is a peak temperature of the maximum endothermic peak and Tc is a peak temperature of the maximum exothermic peak.

The present inventors discovered that, by setting up a structure as described above, a core-shell particle can be provided that enables the exudation of hydrocarbon wax to the outside even under light pressure, such as that during fixing, and that is thus highly effective as a release agent. The reasons for this are considered to be as follows.

In DSC measurement using the core-shell particle as sample, an endothermic peak during temperature ramp up indicates melting of the hydrocarbon wax contained in the core. The subsequent exothermic peak during temperature ramp down represents freezing of the melted hydrocarbon wax. When the freezing temperature here becomes 5° C. or more lower than the melting temperature, it is thought that the hydrocarbon wax has compatibilized with the organosilicon polymer shell upon melting and freezing point depression is then produced.

Upon exposure to high temperatures, e.g., during fixing, due to compatibilization between the hydrocarbon wax and organosilicon polymer shell, the shell softens and the particle is then easily deformed, and in combination with this the melted hydrocarbon wax can readily exude to the outside from regions where compatibilization has progressed. It is thought that the melted hydrocarbon wax exhibits good wettability with the organosilicon polymer shell and as a consequence readily wets and spreads out to the outside from regions of compatibilization with the organosilicon polymer shell, and that the hydrocarbon wax can then exude out even at light pressures.

In addition, the maximum Feret diameter of the core-shell particle is 20 to 500 nm. Having the maximum Feret diameter be at least 20 nm makes it possible to encapsulate the amount of hydrocarbon wax required for compatibilization; having the maximum Feret diameter be not more than 500 nm makes it possible to form an organosilicon polymer shell with the strength required to provide an improved durability.

Another embodiment of present disclosure relates to a core-shell particle comprising a core, and a shell on a surface of the core, wherein: the core comprises a hydrocarbon wax; a value of a sum of a number-average value of Feret diameter of the core-shell particle and a standard deviation of the Feret diameter of the core-shell particle is 20 to 500 nm; the shell comprises an organosilicon polymer; and the organosilicon polymer comprises a structure given by a following formula (RT3)

$$R—SiO_{3/2} \quad (RT3)$$

wherein R in formula (RT3) represents an alkyl group having 1 to 6 carbons.

The present inventors discovered that, by setting up a structure as described above, a core-shell particle can be provided that enables the exudation of hydrocarbon wax to the outside even under light pressure, such as that during fixing, and that is thus highly effective as a hydrocarbon wax. The reasons for this are considered to be as follows.

Hydrocarbon wax and an organosilicon polymer having the structure given by (RT3) exhibit compatibility with each other deriving from the structural similarity between the alkyl group R and the hydrocarbon wax. It is thought that, upon exposure to high temperatures, e.g., during fixing, due to compatibilization between the hydrocarbon wax and organosilicon polymer shell having the structure given by (RT3), the shell softens and the particle is then easily deformed, and in combination with this the melted hydrocarbon wax can readily exude to the outside from regions where compatibilization has progressed. It is thought that the melted hydrocarbon wax exhibits good wettability with the organosilicon polymer shell and as a consequence readily wets and spreads out to the outside from regions of compatibilization with the organosilicon polymer having the structure given by (RT3), and that the hydrocarbon wax can then exude out even at light pressures.

In addition, the maximum Feret diameter of the core-shell particle is 20 to 500 nm. Having the maximum Feret diameter be at least 20 nm makes it possible to encapsulate the amount of hydrocarbon wax required for compatibilization; having the maximum Feret diameter be not more than 500 nm makes it possible to secure the required durability through the formation of an organosilicon polymer shell having the structure given by (RT3).

The embodiments of the present disclosure identified above are described in the following. As indicated in the preceding, the core-shell particle is highly effective as a release agent and is also provided with durability. As a consequence, for example, it is advantageously used as an external additive for toners that is externally added to a toner particle. In the following, the core-shell particle is described using the example of an external additive for toners.

The value (maximum Feret diameter) of the sum of the number-average value of the Feret diameter of the core-shell particle and the standard deviation thereof is 20 to 500 nm. This maximum Feret diameter is preferably 50 to 400 nm, more preferably 80 to 300 nm, still more preferably 100 to 200 nm, and even more preferably 120 to 180 nm. The maximum Feret diameter can be controlled using the size of the particle used for the core and the thickness of the shell that is formed.

In DSC measurement of the core-shell particle, a maximum endothermic peak is present when the temperature is raised from 30° C. to 120° C. at 10.0° C./min, and a maximum exothermic peak is present when the temperature is lowered from 120° C. to 30° C. at 10.0° C./min. In addition, Tc is at least 5° C. lower than Tm where Tm (° C.) is the peak temperature of this maximum endothermic peak and Tc (° C.) is the peak temperature of this maximum exothermic peak. That is, Tm-Tc is at least 5° C.

Tm-Tc is preferably 5 to 20° C., more preferably 7 to 15° C., still more preferably 8 to 12° C., and even more preferably 9 to 11° C. As noted above, it is thought that the release agent or hydrocarbon wax compatibilizes with the organosilicon polymer shell upon melting, and as a consequence freezing point depression is produced and Tm-Tc becomes at least 5° C. As a result, the shell undergoes softening and the melted release agent or hydrocarbon wax can then readily exude to the outside from regions where compatibilization has progressed. Due to this, an excellent wraparound behavior during fixing is provided when the particle is used as an external additive for toners.

Tm-Tc represents the compatibility between the shell material and the crystalline material that is used for the core, and it can be controlled through the type of materials used for the core and shell and the conditions for shell formation. For example, Tm-Tc can be made larger by selecting materials having similar SP values. In addition, Tm-Tc can be made smaller by selecting materials having dissimilar SP values. When, as in Japanese Patent Application Laid-open No. 2018-189954, an organosilicon polymer that uses a methacryloyl group-bearing organosilicon compound is adopted for the shell, it is thought that bonds due to vinyl polymerization are added in addition to the siloxane bonds and as a consequence the compatibility with other materials is diminished and Tm-Tc becomes less than 5° C.

Tc is preferably 50 to 110° C., more preferably 55 to 100° C., still more preferably 60 to 90° C., and even more preferably 62 to 70° C.

The crystalline release agent contained in the core is not particularly limited, but the following can be provided as examples. The crystalline release agent is preferably at least one ester wax selected from the group consisting of ester waxes for which the main component is fatty acid ester, e.g., carnauba wax, behenyl behenate, and stearic acid esters of dipentaerythritol. A single one of these waxes may be used or a combination of two or more may be used. The release agent indicates a substance that has a kinematic viscosity at 110° C. of not more than 100 $mm^2/s$. The kinematic viscosity at 110° C. of the core containing the crystalline release agent or hydrocarbon wax is preferably 1 to 60 $mm^2/s$, more preferably 2 to 30 $mm^2/s$, and still more preferably 4 to 10 $mm^2/s$.

The hydrocarbon wax contained in the core is not particularly limited, but the following can be provided as examples. The hydrocarbon wax is preferably at least one hydrocarbon wax selected from the group consisting of low molecular weight polyethylenes, low molecular weight polypropylenes, microcrystalline waxes, Fischer-Tropsch waxes, and paraffin waxes. A single one of these waxes may be used or a combination of two or more may be used. The hydrocarbon wax preferably contains a paraffin wax.

In the case of use as an external additive for toners, wraparound during fixing can be suppressed by using the crystalline release agent or hydrocarbon wax for the core. In addition, the release agent contained by the toner particle can be reduced from that for the use of a resin, e.g., a styrene-acrylic resin, in the core, and it is thought that as a result the durability is improved and suppression of image streaking and fogging is facilitated. In addition, it is thought that the amount of release agent present at the toner base particle surface can be reduced and the charge rise performance is also improved.

A known procedure can be used to particulate these release agents and hydrocarbon waxes. Examples here are procedures in which emulsification is performed by stirring or ultrasound in the presence of a surfactant, phase inversion emulsification procedures, emulsion polymerization procedures, and emulsion aggregation procedures.

The shell contains an organosilicon polymer. For the case of use of the particle as an external additive for toners, the durability is improved by the organosilicon polymer and image streaking and fogging can be suppressed by the organosilicon polymer. The shell need not coat the entire surface of the core, and regions where the core is partially exposed may be present to the extent that the effects of the present disclosure are not impaired. The organosilicon polymer contained in the shell can be specifically exemplified by organosilicon compound polymers in which the main chain is the siloxane bond. Known procedures can be used to form the organosilicon polymer into the shell. For example, the shell can be formed by adding an organosilicon compound, e.g., alkoxysilane, to a solvent in which the core is dispersed and causing hydrolysis and condensation by controlling the temperature and/or pH.

The organosilicon polymer preferably is the condensation polymer of at least one organosilicon compound selected from the group consisting of organosilicon compounds having the structure given by the following formula (Z).

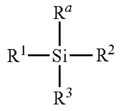

(Z)

In formula (Z), $R^a$ represents an alkyl group having 1 to 8 carbons (preferably 1 to 6, more preferably 1 to 3, and still more preferably 1 or 2 carbons) or represents an aryl group (preferably a phenyl group). It is more preferably an alkyl group having 1 to 6 carbons (preferably 1 to 3 carbons and more preferably 1 or 2 carbons). $R^1$, $R^2$, and $R^3$ each independently represent a halogen atom, hydroxy group, acetoxy group, or alkoxy group having 1 to 6 carbons (preferably 1 to 3 and more preferably 1 or 2 carbons). $R^1$, $R^2$, and $R^3$ preferably each independently represent an alkoxy group having 1 to 6 carbons (preferably 1 to 3 carbons and more preferably 1 or 2 carbons). $R^1$, $R^2$, and $R^3$ are reactive groups and form a crosslinked structure by engaging in hydrolysis, addition polymerization, and condensation. The hydrolysis, addition polymerization, and condensation of $R^1$, $R^2$, and $R^3$ can be controlled through the reaction temperature, reaction time, reaction solvent, and pH.

The use of alkoxysilanes for the organosilicon compound is preferred. The alkoxysilanes can be exemplified by the following: alkoxysilanes that have two alkoxy groups: dimethyldimethoxysilane, diethyldiethoxysilane, and methylethyldimethoxysilane; alkoxysilanes that have three alkoxy groups: methyltrimethoxysilane, methyltriethoxysilane, methyldiethoxymethoxysilane, methylethoxydimethoxysilane, ethyltrimethoxysilane, propyltrimethoxysilane, butyltrimethoxysilane, hexyltrimethoxysilane, octyltrimethoxysilane, octyltriethoxysilane, phenyltrimethoxysilane, and phenyltriethoxysilane; and alkoxysilanes that have four alkoxy groups: tetramethoxysilane.

Among the preceding, the organosilicon polymer preferably is a condensation polymer of at least one organosilicon compound selected from the group consisting of alkoxysilanes that have three alkoxy groups. For example, the organosilicon polymer preferably is a condensation polymer of at least one organosilicon compound selected from the group consisting of methyltrimethoxysilane, propyltrimethoxysilane, hexyltrimethoxysilane, phenyltriethoxysilane, and octyltriethoxysilane. Two or more species of alkoxysilane may be used in combination. When this is done, an alkoxysilane having one alkoxy group may also be used. The following are examples: alkoxysilanes that have one alkoxy group: trimethylmethoxysilane and triethylmethoxysilane.

The organosilicon polymer preferably contains a T3 unit structure as represented by the following formula (RT3). Fogging after extended use is readily suppressed by the incorporation of the RT3 structure.

$$R\text{—}SiO_{3/2} \qquad \text{(RT3)}$$

In formula (RT3), R represents an alkyl group having 1 to 6 (preferably 1 to 3 and more preferably 1 or 2) carbons.

An organosilicon polymer having the (RT3) structure is obtained, for example, by the hydrolysis condensation of a compound or compounds selected as appropriate from organosilicon compounds having the structure given by formula (Z). It is preferably the condensation polymer of alkoxysilane having three alkoxy groups. The R in this structure is a C1 to C6 alkyl group and corresponds to the $R^a$ in formula (Z). Alkoxysilanes having three alkoxy groups can be exemplified by the following. A single one of these may be used or two or more may be used in combination. The organosilicon polymer preferably is a condensation polymer of at least one selection from the group consisting of methyltrimethoxysilane, ethyltrimethoxysilane, propyltrimethoxysilane, butyltrimethoxysilane, pentyltrimethoxylsilane, and hexyltrimethoxysilane. Condensation polymers of methyltrimethoxysilane are more preferred.

The reason why the suppression of fogging during extended use is facilitated when the structure given by (RT3) is present is thought to be as follows: there is little steric hindrance when the alkoxy group undergoes condensation and a strong shell is formed, and due to this deformation of the external additive is suppressed.

In a solid-state $^{29}$ Si-NMR measurement of the organosilicon polymer, and letting RT3 be the area of the peak corresponding to the structure given by (RT3) and letting S be the sum total of the areas of the peaks for the M unit, D unit, T unit, and Q unit, the value of the ratio of RT3 to S (RT3/S) is preferably 0.50 to 1.00, more preferably 0.80 to 1.00, and still more preferably 0.90 to 1.00, where, M unit is $(Ri)(Rj)(Rk)SiO_{1/2}$, D unit is $(Rg)(Rh)SiO(O_{1/2})_2$, T unit is $RmSi(O_{1/2})_3$, and Q unit is $Si(O_{1/2})_4$, wherein Ri, Rj, Rk, Rg, Rh, and Rm represent a silicon-bonded alkyl group. When this range is observed, this indicates that the structure given by (RT3) is present in the organosilicon polymer to a satisfactory degree and that the effect of the release agent and its durability will be further improved.

Tm is preferably 60 to 120° C., more preferably 65 to 100° C., still more preferably 70 to 90° C., and even more preferably 72 to 80° C. Tm is more preferably not greater than 100° C. That is, the melting point of the crystalline release agent or hydrocarbon wax present in the core is preferably not greater than 100° C. When the core-shell particle is used as an external additive for toners, having Tm be not greater than 100° C. facilitates microcrystallization of the core when the produced external additive is heated (distillation) cooled while dispersed in aqueous solution, and the durability of the external additive is then further enhanced. That is, it is thought that the core, upon being melted by heating (distillation), compatibilizes with a portion of the shell, and it is further thought that when this freezes, the compatibilized shell component forms crystal nuclei, and as a consequence the core undergoes polycrystallization and becomes resistant to deformation due to dispersion of external stress by the grain boundaries. This enables further suppression of reductions in image quality, e.g., image streaking during extended use.

The core-shell particle is preferably subjected to a surface treatment with, for example, a silane coupling agent, titanium coupling agent, higher fatty acid, silicone oil, silicone varnish, or any of various modified silicone varnishes. A single surface treatment agent may be used or two or more may be used in combination. This surface treatment supports adjustment of the charge quantity on the external additive, improvements in the heat-resistant storability, and improvements in the environmental stability.

The toner is described in the following. The toner is a toner that has a binder resin-containing toner particle and an external additive, wherein this external additive is the core-shell particle that has been described in the preceding.

By establishing such a structure or constitution, a toner can be obtained for which higher speeds can coexist with longer life. That is, the release agent or hydrocarbon wax can exude to the outside even under the light pressure due to fixing, and as a consequence, even when higher speeds are being pursued, a longer life can be achieved by reducing the total content of the release agent or hydrocarbon wax while maintaining an excellent release performance.

Preferred embodiments with respect to the toner are described in the following. However, the toner is not limited to the contents provided herein. The external additive will be considered first. The core-shell particle that has been described above is used as an external additive used for the toner. In addition, particles other than the core-shell particles can be co-used on an optional basis as an external additive. This makes it possible to adjust, for example, the flowability, charging performance, and cleaning performance.

This other, co-used external additive can be exemplified by inorganic oxide fine particles composed of, e.g., silica fine particles, alumina fine particles, titanium oxide fine particles, and so forth; inorganic stearic acid compound fine particles, e.g., aluminum stearate fine particles, zinc stearate fine particles, and so forth; and inorganic titanic acid compound fine particles, e.g., strontium titanate, zinc titanate, and so forth. A single one of these co-used external additives may be employed or a combination of two or more may be used.

The total amount of addition of these external additives, expressed as their sum total per 100 mass parts of the toner particle, is preferably from 0.05 mass parts to 10.00 mass parts and more preferably from 0.1 mass parts to 5.0 mass parts.

A known method can be used to fix or immobilize the external additive at the toner particle surface. Examples here are immobilization using a Henschel mixer (dry method) and immobilization by aggregation after the toner particle and external additive have been dispersed in a solvent (wet method).

A wet method is preferred for external addition. For example, a dispersion is prepared in which the toner particle and the core-shell particle functioning as an external additive are dispersed in an aqueous solvent. As necessary, the dispersion is heated to 40 to 70° C. (preferably 50 to 60° C.). The pH of the dispersion is adjusted to 4.0 to 7.0 (preferably 5.0 to 6.0). The toner is obtained by heating (distillation) the dispersion to 80 to 120° C. (preferably 90 to 110° C.), holding for 5 to 200 minutes (preferably 30 to 90 minutes), and cooling (for example, air cooling).

The binder resin will now be considered. The toner particle contains a binder resin. The binder resin is not particularly limited and known binder resins can be used. The following are examples: homopolymers of aromatic vinyl compounds and their substituted forms, e.g., polystyrene and polyvinyltoluene; copolymers of aromatic vinyl compounds, e.g., styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, and styrene-maleate ester copolymer; homopolymers of aliphatic vinyl compounds and their substituted forms, e.g., polyethylene and polypropylene; vinyl resins such as polyvinyl acetate, polyvinyl propionate, polyvinyl benzoate, polyvinyl butyrate, polyvinyl formate, and polyvinyl butyral; vinyl ether resins; vinyl ketone resins; acrylic polymers; methacrylic polymers; silicone resins; polyester resins; polyamide resins; epoxy resins; phenolic resins; rosin; modified rosin; and terpene resins. A single one of these may be used by itself or a combination of a plurality may be used.

Among aromatic vinyl compounds, the binder resin preferably contains a styrene-acrylic resin, e.g., styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, and styrene-butyl methacrylate copolymer.

The aromatic vinyl compounds and their substituted forms can be exemplified by the following: styrene and styrene derivatives, e.g., styrene, a-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene.

The polymerizable monomer for formation of acrylic polymers can be exemplified by acrylic polymerizable monomers, e.g., acrylic acid, methyl acrylate, ethyl acrylate, n-propyl acrylate, isopropyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate.

The polymerizable monomer for formation of methacrylic polymers can be exemplified by methacrylic polymerizable monomers, e.g., methacrylic acid, methyl methacrylate, ethyl methacrylate, n-propyl methacrylate, isopropyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate.

Condensation polymers between the hereafter-exemplified carboxylic acid components and alcohol components can be used as the polyester resin. The carboxylic acid component can be exemplified by terephthalic acid, isophthalic acid, phthalic acid, fumaric acid, maleic acid, cyclohexanedicarboxylic acid, and trimellitic acid. The alcohol component can be exemplified by bisphenol A, hydrogenated bisphenols, ethylene oxide adducts on bisphenol A, propylene oxide adducts on bisphenol A, glycerol, trimethylolpropane, and pentaerythritol.

The polyester resin may be a urea group-containing polyester resin. Preferably the carboxy groups, e.g., in terminal position and so forth, of the polyester resin are not capped. A silicon-containing polyester resin may be used as the polyester resin. The toner particle preferably contains a silicon-containing polyester resin. This makes it possible to detect the carbon atom and the silicon atom when the toner particle surface is submitted to time-of-flight secondary ion mass spectrometry.

An example of a silicon-containing polyester resin is resin provided by the bonding of a silane compound to a polyester resin. For example, the silicon-containing polyester resin is preferably a resin provided by the bonding (for example, an amide bond) of an aminosilane to the carboxy groups in a polyester resin. A known compound, e.g., 3-aminopropyltrimethoxysilane, can be used for the aminosilane. The silicon concentration in the silicon-containing polyester resin is preferably 0.05 to 0.50 mass % and more preferably 0.10 to 0.30 mass %.

When a polyester resin is used as the binder resin, the content of the polyester resin in the binder resin is preferably 1.0 to 15.0 mass % and is more preferably 2.0 to mass %. The content of the silicon-containing polyester resin in the binder resin is preferably 0.1 to 5.0 mass %, more preferably 0.2 to 3.0 mass %, and still more preferably 0.5 to 1.5 mass %. The weight-average molecular weight Mw of the polyester resin is not particularly limited, but is preferably 5000 to 50000 and more preferably 8000 to 30000.

The binder resin may have polymerizable functional groups with the goal of enhancing the viscosity change of the toner at high temperatures. The polymerizable functional group can be exemplified by the vinyl group, isocyanate group, epoxy group, amino group, carboxy group, and hydroxy group.

Among the preceding, styrene-acrylic resins, as typified in particular by styrene-butyl acrylate, are preferred from the standpoint of, e.g., the developing characteristics and fixing performance. The method for producing the polymer is not particularly limited and known methods can be used. The content of styrene-acrylic resin in the binder resin is preferably 50 to 100 mass %, more preferably 80 to 98 mass %, and still more preferably 90 to 95 mass %.

The wax will now be considered. The toner particle may optionally contain a wax. The release performance can be further enhanced by the addition of a wax. In addition, the low-temperature fixability can be improved by making the toner particle softer. Since the external additive exhibits a release performance, the toner particle may then lack a wax content.

There are no particular limitations on this was, and the following are examples: aliphatic hydrocarbon waxes such as low molecular weight polyethylene, low molecular weight polypropylene, microcrystalline wax, Fischer-Tropsch wax, and paraffin wax; the oxides of aliphatic hydrocarbon waxes, e.g., oxidized polyethylene wax, and their block copolymers; waxes in which the main component is a fatty acid ester, e.g., carnauba wax and montanic acid ester wax, and waxes provided by the partial or complete deacidification of a fatty acid ester, e.g., deacidified carnauba wax; saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl monomer such as styrene or acrylic acid; partial esters between a fatty acid and a polyhydric alcohol, such as behenyl monoglyceride; and hydroxy group-containing methyl ester compounds obtained, e.g., by the hydrogenation of plant oils and fats. A single one of these waxes may be used or a combination of two or more may be used.

The aliphatic alcohol for ester wax formation can be exemplified by 1-hexanol, 1-heptanol, 1-octanol, 1-nonanol, 1-decanol, undecyl alcohol, lauryl alcohol, myristyl alcohol, 1-hexadecanol, stearyl alcohol, arachidyl alcohol, behenyl alcohol, and lignoceryl alcohol. The aliphatic carboxylic acids can be exemplified by pentanoic acid, hexanoic acid, heptanoic acid, octanoic acid, nonanoic acid, decanoic acid, lauric acid, myristic acid, palmitic acid, stearic acid, arachidic acid, behenic acid, and lignoceric acid. The wax content, considered per 100.0 mass parts of the binder resin or polymerizable monomer, is preferably from 0.5 mass parts to 20.0 mass parts.

The colorant will now be considered. The toner particle may contain a colorant on an optional basis. The colorant is not particularly limited, and, for example, the known colorants indicated in the following can be used.

Examples of yellow pigments include yellow iron oxide and condensed azo compounds such as Navels Yellow, Naphthol Yellow S, Hansa Yellow G, Hansa Yellow 10G, Benzidine Yellow G, Benzidine Yellow GR, Quinoline Yellow Lake, Permanent Yellow NCG, Tartrazine Lake, and the like, isoindolinone compounds, anthraquinone compounds, azo metal complexes, methine compounds, and allylamide compounds. Specific examples are presented hereinbelow. C.I. Pigment Yellow 12, 13, 14, 15, 17, 62, 74, 83, 93, 94, 95, 109, 110, 111, 128, 129, 147, 155, 168, 180.

Examples of orange pigments are presented below. Permanent Orange GTR, Pyrazolone Orange, Vulcan Orange, Benzidine Orange G, Indanthrene Brilliant Orange RK, and Indathrene Brilliant Orange GK.

Examples of red pigments include Indian Red, condensation azo compounds such as Permanent Red 4R, Lithol Red, Pyrazolone Red, Watching Red calcium salt, Lake Red C, Lake Red D, Brilliant Carmine 6B, Brilliant Carmine 3B, Eosin Lake, Rhodamine Lake B, Alizarin Lake and the like, diketopyrrolopyrrole compounds, anthraquinone compounds, quinacridone compounds, basic dye lake compounds, naphthol compounds, benzimidazolone compounds, thioindigo compounds, perylene compounds. Specific examples are presented hereinbelow. C.I. Pigment Red 2, 3, 5, 6, 7, 23, 48:2, 48:3, 48:4, 57:1, 81:1, 122, 144, 146, 166, 169, 177, 184, 185, 202, 206, 220, 221, 254.

Examples of blue pigments include copper phthalocyanine compounds and derivatives thereof such as Alkali Blue Lake, Victoria Blue Lake, Phthalocyanine Blue, metal-free Phthalocyanine Blue, partial Phthalocyanine Blue chloride, Fast Sky Blue, Indathrene Blue BG and the like, anthraquinone compounds, basic dye lake compound and the like. Specific examples are presented hereinbelow. C.I. Pigment Blue 1, 7, 15:1, 15:2, 15:3, 15:4, 60, 62, 66.

Examples of purple pigments include Fast Violet B and Methyl Violet Lake. Examples of green pigments include Pigment Green B, Malachite Green Lake, and Final Yellow Green G. Examples of white pigments include zinc white, titanium oxide, antimony white and zinc sulfide. Examples of black pigments include carbon black, aniline black, non-magnetic ferrites, magnetite, and those which are colored black by using the abovementioned yellow colorant, red colorant and blue colorant. These colorants can be used singly or in a mixture, or in the form of a solid solution. If necessary, the colorant may be surface-treated with a substance which does not inhibit polymerization. The amount of the colorant is preferably from 1.0 parts by mass to 15.0 parts by mass with respect to 100.0 parts by mass of the binder resin or the polymerizable monomer.

The charge control agent will now be considered. The toner particle may contain a charge control agent on an optional basis. A known charge control agent can be used as this charge control agent, while a charge control agent that provides a fast triboelectric charging speed and that can maintain a defined and stable triboelectric charge amount is preferred. When the toner particle is produced by a polymerization method, a charge control agent that exercises little polymerization inhibition and that is substantially free of material soluble in the aqueous medium is preferred. Charge control agents comprise charge control agents that control toner to negative charging and charge control agents that control toner to positive charging. The following are examples of charge control agents that control toner to negative charging: monoazo metal compounds; acetylacetone-metal compounds; metal compounds of aromatic oxycarboxylic acids, aromatic dicarboxylic acids, oxycarboxylic acids, and dicarboxylic acids; aromatic oxycarboxylic acids, aromatic monocarboxylic acids, and aromatic polycarboxylic acids and their metal salts, anhydrides, and esters; phenol derivatives such as bisphenol; urea derivatives; metal-containing salicylic acid compounds; metal-containing naphthoic acid compounds; boron compounds; quaternary ammonium salts; calixarene; and resin-type charge control agents.

The following, on the other hand, are examples of charge control agents that control toner to positive charging: nigrosine and nigrosine modifications by, e.g., fatty acid metal salts; guanidine compounds; imidazole compounds; quaternary ammonium salts such as tributylbenzylammonium 1-hydroxy-4-naphthosulfonate and tetrabutylammonium tetrafluoroborate, and their onium salt analogues, such as phosphonium salts, and their lake pigments; triphenylmethane dyes and their lake pigments (the laking agent is exemplified by phosphotungstic acid, phosphomolybdic acid, phosphomolybdotungstic acid, tannic acid, lauric acid, gallic acid, ferricyanides, and ferrocyanides); metal salts of higher fatty acids; and resin-type charge control agents. A single one of these charge control agents may be used or combinations of two or more may be used. Among these charge control agents, metal-containing salicylic acid compounds are preferred and metal-containing salicylic acid compounds in which the metal is aluminum or zirconium are particularly preferred. The amount of addition of the charge control agent, per 100.0 mass parts of the binder resin, is preferably from 0.1 mass parts to 20.0 mass parts and is more preferably from 0.5 mass parts to 10.0 mass parts.

A polymer or copolymer having a sulfonic acid group, sulfonate salt group, or sulfonate ester group is preferably used for the charge control resin. The polymer having a sulfonic acid group, sulfonate salt group, or sulfonate ester group particularly preferably contains at least 2 mass %, as the copolymerization ratio, of a sulfonic acid group-containing acrylamide-type monomer or sulfonic acid group-containing methacrylamide-type monomer. A content of at least 5 mass % as the copolymerization ratio is more preferred.

The charge control resin preferably has a glass transition temperature (Tg) of from 35° C. to 90° C. In addition, the peak molecular weight (Mp) is preferably from 10,000 to 30,000, and the weight-average molecular weight (Mw) is preferably from 25,000 to 50,000. When such a charge control resin is used, preferred triboelectric charging characteristics can be conferred without exercising an influence on the thermal characteristics required of a toner particle. Moreover, because the charge control resin contains a sulfonic acid group, the dispersibility of the charge control resin itself in the colorant dispersion and the dispersibility of the colorant can be improved and the tinting strength, transparency, and triboelectric charging characteristics can then be further improved.

The method for producing the toner will now be considered. A known means can be used for the method of producing the toner particle. Examples here are dry production methods, i.e., kneading pulverization methods, and wet production methods, i.e., suspension polymerization methods, dissolution suspension methods, emulsion aggregation methods, and emulsion polymerization and aggregation methods. The use of a wet method is preferred from the standpoints of sharpening the particle size distribution of the toner particle, improving the average circularity of the toner particle, and generating a core-shell structure.

For example, when the toner particle is produced by a kneading pulverization method, which is a dry production method, the binder resin and optionally a wax, colorant, charge control agent, and other additives are thoroughly mixed using a mixer, e.g., a Henschel mixer, ball mill, and so forth. After this, the toner particle is obtained by melt-kneading using a heated kneader, such as a hot roll, kneader, or extruder, to disperse or dissolve the various materials, and by a cooling and solidification step, a pulverization step, a classification step, and optionally a surface treatment step.

A known pulverization apparatus, e.g., a mechanical impact system, jet system, and so forth, may be used in the pulverization step. With regard to the sequence of the classification step and the surface treatment step, either may go before the other. The classification step preferably uses a multi-grade classifier from a productivity standpoint.

Toner particle production by the suspension polymerization method, which is a wet production method, is described in the following. An example of toner particle production using the suspension polymerization method is described in the following, but this should not be taken as a limitation thereto. A polymerizable monomer composition is first obtained in the suspension polymerization method; this is done by dissolving or dispersing the following to uniformity using a disperser such as a ball mill or an ultrasound disperser: polymerizable monomer for producing the binder resin and optionally wax, colorant, charge control agent, crosslinking agent, polymerization initiator, and other additives (step of preparing a polymerizable monomer composition). The polymerizable monomer here can be exemplified by the polymerizable monomers provided as examples of polymerizable monomers for forming the previously described vinyl copolymer.

The crosslinking agent may be added on an optional basis during polymerization of the polymerizable monomer in order to control the molecular weight of the binder resin. Mainly a compound having two or more polymerizable double bonds is used as the crosslinking agent. Examples are aromatic divinyl compounds such as divinylbenzene and divinylnaphthalene; carboxylate esters containing two double bonds, such as ethylene glycol diacrylate, diethylene glycol diacrylate, triethylene glycol diacrylate, tetraethylene glycol diacrylate, neopentyl glycol diacrylate, 1,3-butanediol diacrylate, 1,3-butylene glycol diacrylate, 1,4-butanediol diacrylate, 1,5-pentanediol diacrylate, 1,6-hexanediol diacrylate, the diacrylates of polyethylene glycol #200, #400, and #600, dipropylene glycol diacrylate, polypropylene glycol diacrylate, polyester-type diacrylates (MANDA, Nippon Kayaku Co., Ltd.), and crosslinking agents provided by changing the acrylate in the preceding to methacrylate; divinyl compounds such as divinylaniline, divinyl ether, divinyl sulfide, and divinyl sulfone; and compounds having three or more vinyl groups. A single one of these may be used or a mixture of two or more may be used. The amount of addition of the crosslinking agent is preferably from 0.1 mass parts to 15.0 mass parts per 100 mass parts of the polymerizable monomer.

The polymerizable monomer composition is then introduced into a previously prepared aqueous medium and droplets of the polymerizable monomer composition are formed in the desired toner particle size using a high-shear stirrer or a disperser (granulation step). The aqueous medium in the granulation step preferably contains a dispersion stabilizer in order to suppress toner particle coalescence during the production sequence, control the particle size of the toner particle, and sharpen the particle size distribution. The dispersion stabilizers can be generally categorized into polymers, which generate a repulsive force through steric hindrance, and sparingly water-soluble inorganic compounds, which support dispersion stabilization through an electrostatic repulsive force. Fine particles of a sparingly water-soluble inorganic compound, because they can be dissolved by acid or alkali, are advantageously used because they can be easily removed by dissolution by washing with acid or alkali after polymerization. When the dispersion stabilizer is a sparingly water-soluble inorganic compound, the use is preferred of a dispersion stabilizer that contains any of the following: magnesium, calcium, barium, zinc, aluminum, and phosphorus. The dispersion stabilizer more preferably contains any of the following: magnesium, calcium, aluminum, and phosphorus.

Specific examples are as follows: magnesium phosphate, tricalcium phosphate, aluminum phosphate, zinc phosphate, magnesium carbonate, calcium carbonate, magnesium hydroxide, calcium hydroxide, aluminum hydroxide, calcium metasilicate, calcium sulfate, barium sulfate, and hydroxyapatite. When such a sparingly water-soluble inorganic dispersing agent is used, it may be used as such, or, in order to obtain even finer particles, use may be made of inorganic dispersing agent particles that have been produced in the aqueous medium. Using the case of tricalcium phosphate as an example, an aqueous sodium phosphate solution may be mixed with an aqueous calcium chloride solution under high-speed stirring to produce water-insoluble calcium phosphate, thus enabling a more uniform and finer dispersion.

An organic compound, for example, polyvinyl alcohol, gelatin, methyl cellulose, methyl hydroxypropyl cellulose, ethyl cellulose, the sodium salt of carboxymethyl cellulose, and starch, may also be used in combination in said dispersion stabilizer. These dispersion stabilizers are preferably used at from 0.1 mass parts to 20.0 mass parts per 100 mass parts of the polymerizable monomer. A surfactant may also be used at from 0.1 mass parts to 10.0 mass parts per 100 mass parts of the polymerizable monomer in order to microfine-size these dispersion stabilizers. Specifically, a commercial nonionic, anionic, or cationic surfactant can be used. For example, the use is preferred of sodium dodecyl sulfate, sodium tetradecyl sulfate, sodium pentadecyl sulfate, sodium octyl sulfate, sodium oleate, sodium laurate, potassium stearate, or calcium oleate.

The polymerizable monomer present in the polymerizable monomer composition is polymerized, after the granulation step or while carrying out the granulation step, with the temperature set preferably to from 50° C. to 90° C. to obtain a toner particle dispersion (polymerization step). During the polymerization step, a stirring operation sufficient to provide a uniform temperature distribution in the vessel is preferably carried out. When a polymerization initiator is added, this addition may be carried out using any timing and for any required length of time. In addition, with the goal of obtaining a desired molecular weight distribution, the temperature may be raised in the latter half of the polymerization reaction, and, in order to remove, e.g., unreacted polymerizable monomer and by-products, from the system, a portion of the aqueous medium may be distilled off by a distillation process in the latter half of the reaction or after the completion of the reaction. The distillation process is carried out at normal pressure or under reduced pressure.

The polymerization initiator used in the suspension polymerization method preferably has a half-life in the polymerization reaction of from 0.5 hour to 30 hours. A polymer having a maximum between molecular weights of 5000 and 50000 can be obtained when the polymerization reaction is carried out using an amount of addition of from 0.5 mass parts to 20 mass parts per 100 mass parts of the polymerizable monomer. Oil-soluble initiators are generally used as the polymerization initiator.

The following are examples: azo compounds, e.g., 2,2'-azobisisobutyronitrile, 2,2'-azobis-2,4-dimethylvaleronitrile, 1,1'-azobis(cyclohexane-1-carbonitrile), and 2,2'-azobis-4-methoxy-2,4-dimethylvaleronitrile, and peroxide initiators such as acetyl cyclohexylsulfonyl peroxide, diisopropyl peroxycarbonate, decanoyl peroxide, lauroyl peroxide, stearoyl peroxide, propionyl peroxide, acetyl peroxide, tert-butyl peroxy-2-ethylhexanoate, benzoyl peroxide, tert-butyl peroxyisobutyrate, cyclohexanone peroxide, methyl ethyl ketone peroxide, dicumyl peroxide, tert-butyl hydroperoxide, di-tert-butyl peroxide, tert-butyl peroxypivalate, and cumene hydroperoxide.

A water-soluble initiator may be co-used on an optional basis for the polymerization initiator, and examples thereof are as follows: ammonium persulfate, potassium persulfate, 2,2'-azobis(N,N'-dimethyleneisobutyroamidine) hydrochloride, 2,2'-azobis(2-aminodinopropane) hydrochloride, azobis(isobutylamidine) hydrochloride, sodium 2,2'-azobisisobutyronitrilesulfonate, ferrous sulfate, or hydrogen peroxide. A single one of these polymerization initiators may be used by itself or two or more may be used in combination. A chain transfer agent, polymerization inhibitor, and so forth may also be added and used in order to control the degree of polymerization of the polymerizable monomer.

The particle diameter of the toner particle is preferably a weight-average particle diameter of from 3.0 μm to 10.0 μm from the standpoint of obtaining a high-definition and high-resolution image. The weight-average particle diameter of the toner particle can be measured using the pore electrical resistance method. For example, measurement can be performed using a "Coulter Counter Multisizer 3" (Beckman Coulter, Inc.). The toner particle dispersion provided by going through the polymerization step is transferred to a filtration step that performs solid-liquid separation of the toner particle from the aqueous medium.

The solid-liquid separation for obtaining the toner particle from the resulting toner particle dispersion can be carried out using an ordinary filtration method. This is preferably following by additional washing by, e.g., reslurrying or washing with wash water, in order to remove foreign material that could not previously be removed from the toner particle surface. After thorough washing has been carried out, a toner cake is obtained by carrying out another solid-liquid separation. The toner particle is subsequently obtained by drying using a known drying means and as necessary separating out, by classification, particle fractions that have a non-spec particle diameter. When this is done, the separated particle fractions having a non-spec particle diameter may be re-used in order to improve the final yield.

Preferably the toner comprises carbon atoms and silicon atoms at the surface of the toner particle. Preferably the carbon atom and silicon atom are detected when the surface of the toner particle is subjected to time-of-flight secondary ion mass spectrometry. By establishing such a construction, the charge rise rate can be improved still further. This is thought to be due to the following: when the core-shell particle functioning as an external additive undergoes charging, the charge then easily migrates to the carbon atoms and silicon atoms present at the toner particle surface from the carbon atoms and silicon atoms that constitute the organosilicon polymer present in the shell of the external additive. This effect comes substantial when both the carbon atom and silicon atom are present in regions involved with charging. As a result of such a charge diffusion, there is an increase in regions that can participate in charging and charging is facilitated. The charge rise rate is also improved due to this.

The use of the above-described silicon-containing polyester resin in toner particle production is an example of a method for bringing about detection of the carbon atom and silicon atom at the toner particle surface. Also preferred in toner particle production is a means of forming, at the toner particle surface, a condensation product of the organosilicon compound having the structure given by formula (Z), supra. That is, the toner particle preferably has an organosilicon compound condensation product at the surface. For example, a shell of an organosilicon compound condensation product (an organosilicon polymer) may be formed on the toner particle surface.

The developer will now be considered. The toner can be used as a magnetic or nonmagnetic one-component developer, but it may be also mixed with a carrier and used as a two-component developer. As the carrier, magnetic particles composed of conventionally known materials such as metals such as iron, ferrites, magnetite and alloys of these metals with metals such as aluminum and lead can be used. Among them, ferrite particles are preferable. Further, a coated carrier obtained by coating the surface of magnetic particles with a coating agent such as a resin, a resin dispersion type carrier obtained by dispersing magnetic fine powder in a binder resin, or the like may be used as the carrier. The volume average particle diameter of the carrier is preferably from 15 μm to 100 μm, and more preferably from 25 μm to 80 μm.

The methods for measuring the various properties of, e.g., the core-shell particle (external additive), are described in the following.

Method for Measuring the Maximum Feret Diameter of the External Additive

The maximum Feret diameter of the external additive is measured using observation and image measurement with a scanning electron microscope (UltraPlus, Zeiss). The image acquisition conditions are as follows.

(1) Specimen Preparation

Carbon tape is glued onto the sample stand (aluminum sample stand: diameter 12.5 mmφ×6 mm), and the external additive—or toner to which the external additive has been externally added—for which the maximum Feret diameter is to be measured is mounted on this. Excess sample is removed from the sample stand by blowing with air. The sample stand is set in the sample holder, and this is set in the electron microscope.

(2) Setting the Observation Conditions at the Electron Microscope

Calculation of the maximum Feret diameter of the external additive is carried out using images obtained by backscattered electron observation with the Ultra Plus. In the backscattered electron image, the carbon tape and toner particle are observed with low brightness and the external additive is observed with high brightness, thereby facilitating image processing. 0.7 kV is used for the acceleration voltage, and 3.0 mm is used for the WD.

(3) Focus Adjustment

The observation magnification is set to 30000(30 k)X, and the Alignment and Stigma are adjusted. The external additive is focused at an observation magnification of 50 k. Here, when the observation surface has a large tilt angle, it is difficult to achieve focus simultaneously over the field of view. During focus adjustment, the observation position is set such that the entire observation surface is in focus at the same time.

(4) Image Storage

The contrast and brightness are set as appropriate and an image is acquired at a size of 1024×768 pixels and is saved. This image is taken for 10 or more fields of view.

(5) Image Analysis

The maximum Feret diameter is determined from the obtained SEM images using Image J image analysis software (Wayne Rasband, developer). The calculation procedure is as follows.

A) Set the scale with [Analyze]—[Set Scale].

B) Use [Process]—[Noise]—[Despeckle] to blur other than the contour.

C) Use [Process]—[Sharpen] to emphasize the contour.

D) Set the threshold with [Image]—[Adjust]—[Threshold] and binarize. (Set to a value (specifically, Auto) where no noise remains and the external additive, which is the measurement target, remains.)

E) Add the perimeter with [Process]—[Binary]—[Dilate].

F) Erase the perimeter with [Process]—[Binary]—[Erode].

G) Separate overlapping with [Process]—[Binary]—[Watershed].

H) Delete other than external additive to be evaluated.

I) Check [Ferets Diameter] in [Analyze]—[Set Measurements]. Also, set [Redirect to] to [None] and [Decimal Place (0-9)] to 3.

J) Execute analysis with [Analyze]—[Analyze Particle].

K) Perform the same analysis on the remaining 9 observed images.

L) The (number average value+standard deviation) of the Feret (Feret diameter) of the obtained analysis results is taken to be the maximum Feret diameter.

Confirmation of the Core-Shell Structure of the External Additive

TEM-EDX observation (energy-dispersive x-ray analysis using a transmission electron microscope) is used to confirm whether the external additive presents a core-shell structure. For the external additive, the sample used for TEM observation is provided by broadcasting the external additive onto a grid provided with a support film and lightly blowing with air and using this for the measurement. Observation of the cross section is carried out when external addition to the toner has been performed. The toner particle cross section is prepared proceeding as follows.

Using an osmium plasma coater (OPC80T, Filgen, Inc.), an Os film (5 nm) and a naphthalene film (20 nm) are executed on the toner as protective films. After embedding with D800 photocurable resin (JEOL Ltd.), toner particle cross sections with a film thickness of 100 nm are prepared using an ultrasound ultramicrotome (UC7, Leica) and a slicing rate of 1 mm/s.

STEM-EDX observation is carried out on the resulting cross sections using the STEM function of a TEM-EDX (TEM: JEM2800 (200 keV), JEOL Ltd.; EDX detector: Dry SD 100GV, JEOL Ltd.; EDX system: NORAN System 7, Thermo Fisher Scientific Inc.). The STEM probe size is 1.0 nm, the observation magnification is 50 to 150 k, the EDX image size is 256×256 pixels, the storage rate is adjusted to 10,000 cps, and acquisition is carried out by accumulating 100 frames.

When the external additive has a core-shell structure, silicon is observed to a great extent at the periphery of the external additive while carbon is observed to a great extent in the interior of the external additive. A core-shell structure can be confirmed for the external additive from this and the backscattered electron image observed in the procedure of the “Method for measuring the maximum Feret diameter of the external additive”. Specifically, the externally additive can be assessed as having a core-shell structure when contrast originating with organic material is not seen in the surface layer in the backscattered electron image while there is a coating by contrast deriving from silicon.

Evaluation of the Structure of the Organosilicon Polymer Shell

NMR is used to confirm that the organosilicon polymer shell of the external additive has the structure given by (RT3). When the isolated external additive can be obtained, measurement is carried out on this as such. When the external additive is fixed to toner, the organosilicon polymer shell is recovered proceeding as follows. 1 g of the toner is introduced into a vial and is dissolved and dispersed in 31 g of chloroform. A dispersion is prepared by treatment for 30 minutes using an ultrasound homogenizer for dispersion.

Ultrasound treatment instrument: VP-050 ultrasound homogenizer (TIETECH Co., Ltd.)

Microtip: stepped microtip, 2 mmφ end diameter

Position of microtip end: center of glass vial, 5 mm height from bottom of vial

Ultrasound conditions: 30% intensity, 30 minutes. During this treatment, the ultrasound is applied while cooling the vial with ice water to prevent the temperature of the dispersion from rising.

The dispersion is transferred to a glass tube (50 mL) for swing rotor service and centrifugal separation is carried out using a centrifugal separator (H-9R, Kokusan Co., Ltd.) and conditions of 58.33 $S^{-1}$ and 30 minutes. After centrifugal separation, the organosilicon polymer shell is separated as a layer in the glass tube. When a plurality of external additive components are present, each layer separated for each component is submitted to SEM-EDX observation and the layer containing the organosilicon polymer shell is identified from the shell structure and the Si and O elemental composition. This is extracted and redispersed in 10 g chloroform for washing, and the organosilicon polymer shell is separated using a centrifugal separator. After the execution of the washing procedure, the chloroform is removed by vacuum drying (40° C./24 hours) the extracted organosilicon polymer shell to yield the isolated organosilicon polymer shell.

Using this isolated sample, the evaluation of the structures in the organosilicon polymer shell is carried out by solid-state $^{29}$Si-NMR measurement. With solid-state $^{29}$Si-NMR, peaks are detected in different shift regions depending on the number of functional groups bonded to the Si constituting the organosilicon polymer shell. The number of functional groups for each peak can be identified using a reference sample. The occurrence ratio for each constituent compound can be calculated from the obtained peak areas. Because the (RT3) structure has one Si-bonded functional group, the peak corresponding to this should be detected.

The conditions in the solid-state $^{29}$ Si-NMR measurement are, for example, as follows.

Instrument: JNM-ECX500II, JEOL RESONANCE

Measurement temperature: room temperature

Measurement method: DDMAS method, $^{29}$Si, 45°

Sample tube: zirconia 3.2 mmφ

Sample: filled as a powder into the sample tube

Sample spinning rate: 10 kHz

Relaxation delay: 180 s

Number of scans: 2000

To assess what proportion of the Si present has the RT3 structure (RT3/S), peak separation is performed after the measurement by curve fitting multiple silane components having different substituents and bonding groups for the organosilicon polymer shell, and the respective peak areas are then calculated.

Specifically, peak separation into the M unit, D unit, T unit, and Q unit indicated below is performed by curve fitting. Curve fitting is performed using EXcalibur for Windows (registered trademark) version 4.2 (EX series) software for the JNM-EX400 from JEOL Ltd. "1D Pro" is clicked from the menu icon and the measurement data is loaded. Curve fitting is performed by selecting "Curve fitting function" from "Command" on the menu bar. Curve fitting is carried out for each component such that the difference (synthetic peak difference) between the peaks according to the measurement results and the synthetic peaks provided by synthesis of each peak yielded by curve fitting reaches a minimum.

The RT3 structure is included in the following T unit.

M unit: $(R_i)(R_j)(R_k)SiO_{1/2}$ formula (4)

D unit: $(R_g)(R_h)Si(O_{1/2})_2$ formula (5)

T unit: $R_mSi(O_{1/2})_3$ formula (6)

Q unit: $Si(O_{1/2})_4$ formula (7)

The $R_i$, $R_j$, $R_k$, $R_g$, $R_h$, and $R_m$ in formulas (4), (5), and (6) represent, e.g., a silicon-bonded alkyl group, e.g., a C1 to C6 hydrocarbon group, halogen atom, hydroxy group, acetoxy group, or alkoxy group. After peak separation, the sum total S of all the integration values for the M, D, T, and Q units is calculated.

Identification of the R in the (RT3) structure is carried out using solid-state $^{13}$C-NMR. The conditions in the solid-state $^{13}$C-NMR measurement are, for example, as follows.

Instrument: JNM-ECX500II, JEOL RESONANCE

Measurement temperature: room temperature

Pulse mode: CP/MAS

Measurement nucleus frequency: 123.25 MHz ($^{13}$C)

Sample tube: zirconia 3.2 mmφ

Sample: filled as a powder into the sample tube

Sample spinning rate: 20 kHz

Reference substance: adamantane (external reference: 29.5 ppm)

Contact time: 2 ms

Delay time: 2 s

Number of scans: 1024

The R is confirmed by this method through the presence/absence of a signal originating with, for example, the silicon atom-bonded methyl group ($Si—CH_3$), ethyl group ($Si—C_2H_5$), propyl group ($Si—C_3H_7$), butyl group ($Si—C_4H_9$), pentyl group ($Si—C_5H_{11}$), hexyl group ($Si—C_6H_{13}$), or phenyl group ($Si—C_6H_5$). RT3/S is calculated based on this analysis where RT3 is the area of the peak corresponding to the structure given by (RT3).

Measurement of the Maximum Endothermic Peak Tm and Maximum Exothermic Peak Tc of the External Additive A differential scanning calorimeter is used to measure the maximum endothermic peak Tm and the maximum exothermic peak Tc of the external additive. When the isolated external additive can be obtained, measurement is carried out on this as such. When the external additive is fixed to toner, the external additive is recovered proceeding as follows.

20 g of "Contaminon N" (a 10 mass % aqueous solution of a neutral pH 7 detergent for cleaning precision measurement instrumentation, comprising a nonionic surfactant, anionic surfactant, and organic builder) is weighed into a vial with a 50 mL capacity and mixing with 1 g of the toner is carried out. This is then set in a "KM Shaker" (model: V. SX) from Iwaki Sangyo Co., Ltd., and shaking is carried out for 120 seconds with the speed set to 50. This serves to transfer the external additive from the toner particle surface to the dispersion side.

This is followed by separation, using a centrifugal separator (H-9R, Kokusan Co., Ltd.) (5 minutes at 16.67 $S^{-1}$), of the toner particle and the external additive, which transfers into the supernatant. The supernatant containing the external additive is collected and is subjected to additional centrifugal separation using conditions of 58.33 $S^{-1}$ and 30 minutes. After centrifugal separation, the core-shell external additive is separated as a layer in the glass tube. When a plurality of external additive components are present, each layer separated for each component is submitted to SEM-EDX observation, and the layer containing the core-shell external additive is identified from the shell structure and the Si and O elemental composition. This is collected and dispersed in 10 g of deionized water for washing and the core-shell external additive is then separated using a centrifugal separator.

The measurement is performed on the isolated external additive in accordance with ASTM D3418-82 using a "Q2000" differential scanning calorimeter (TA Instruments). Temperature correction in the instrument detection section is performed using the melting points of indium and zinc, and the amount of heat is corrected using the heat of fusion of indium.

Specifically, a 2 mg sample is exactly weighed out and this is introduced into an aluminum pan; an empty aluminum pan is used for reference. The measurement is run at a ramp rate of 10.0° C./min in the measurement temperature range from 30° C. to 120° C. For the measurement, heating is carried out to 120° C., followed by cooling to 30° C. at a ramp down rate of 10.0° C./min. Tm (° C.) is taken to be the temperature where the maximum endothermic peak appears in the DSC curve obtained in this heating process, and Tc (° C.) is taken to be the temperature where the maximum exothermic peak appears in the DSC curve obtained in the cooling process.

Structural Evaluation of the Core

Pyrolysis GC-MS is used for structural evaluation of the core of the external additive. When the isolated external additive can be obtained, measurement is carried out on this as such. When the external additive is fixed to toner, the external additive is recovered using the method described above with reference to measurement of the Tm and Tc.

The structure of the core containing crystalline release agent or hydrocarbon wax can be evaluated by subjecting the isolated external additive to pyrolysis GC/MS. The structure of the core can be identified by analysis of the mass spectrum of the components of the decomposition product that originates with the crystalline release agent or hydrocarbon wax and is produced when the external additive undergoes thermal decomposition at about 550° C. to 700° C. The instrument used and the measurement conditions are given below. The crystallinity can be checked by evaluation of the aforementioned Tm and Tc.

Pyrolysis instrument: JPS-700 (Japan Analytical Industry Co., Ltd.)

Decomposition temperature: 590° C.

GC/MS instrument: Focus GC/ISQ (Thermo Fisher)

Column: HP-5MS, length 60 m, inner diameter 0.25 mm, film thickness 0.25 μm

Injection port temperature: 200° C.

Flow pressure: 100 kPa

Split: 50 mL/min

MS ionization: EI

Ion source temperature: 200° C. Mass Range: 45-650

Method for Evaluating the Carbon Atom and Silicon Atom at the Toner Particle Surface Identification of the carbon atom and silicon atom present at the toner particle surface is carried out by evaluation of the toner particle using a time-of-flight secondary ion mass spectrometer (TOF-SIMS). The instrument used and the measurement conditions are given below.

Measurement instrument: nanoTOFII (product name, ULVAC-PHI, Incorporated)

Primary ion species: $Bi^{3++}$

Acceleration voltage: 30 kV

Primary ion current: 0.05 pA

Repetition frequency: 8.2 kHz

Raster mode: Unbunch

Raster size: 50 μm×50 μm, 256×256 pixels

Measurement mode: Positive

Neutralization electron gun: used

Measurement time: 600 s

Sample preparation: the toner is fixed to an indium sheet

Sample pretreatment: none

The presence of the carbon atom and silicon atom in regions where the toner particle surface is exposed can be checked by imaging the toner particle at the mass numbers of carbon and silicon using standard software (TOF-DR) from ULVAC-PHI, Inc. Regions where the toner particle surface is exposed can be selected by SEM observation of regions where the ion image is measured and comparison of the images.

Method for Evaluating the Kinematic Viscosity of the Release Agent- or Wax-Containing Core With regard to the kinematic viscosity of the release agent- or wax-containing core, the core is measured when the core can be prepared. When measurement is carried out beginning with the external additive, the measurement is carried out on the extracted core. When the isolated external additive can be obtained, extraction is carried out using this. When the external additive is fixed to toner, extraction is carried out after the external additive has been recovered using the method described above in the measurement of Tm and Tc.

1 g of the external additive obtained proceeding as described above is weighed out and placed in a thimble (No. 84, Toyo Roshi Kaisha, Ltd.) and this is installed in a Soxhlet extractor. Extraction is carried out for 20 hours using 200 mL of THF as the solvent, and the solid yielded by removal of the extraction solvent is the release agent or hydrocarbon wax core. This is carried out a plurality of times to obtain the required amount of core. A fully automatic system for measuring the kinematic viscosity of small samples (Viscotech Co., Ltd.) is used as the instrument for measuring the kinematic viscosity, and the kinematic viscosity is measured at 110° C.

Method for Recovering Polyester Resin from the Toner Particle

Extraction of the polyester resin in the toner particle is carried out by performing separation by solvent gradient elution on an extract obtained using tetrahydrofuran (THF). The preparative method is given in the following. 10.0 g of the toner particle is weighed out and is introduced into an extraction thimble (No. 84, Toyo Rosha Kaisha, Ltd.), and this is set into a Soxhlet extractor. Extraction is performed for 20 hours using 200 mL of THF as the solvent, and the solvent is then removed from the extract to yield a solid that is the THF-soluble matter. The polyester resin is contained in the THF-soluble matter. This procedure is performed a plurality of times to obtain the required amount of THF-soluble matter.

Gradient preparative HPLC (LC-20AP High-Performance Gradient Preparative System, Shimadzu Corporation; 50 mmø×250 mm SunFire Preparative Column, Waters Corporation) is used for the solvent gradient elution procedure. The following are used: 30° C. for the column temperature, 50 mL/min for the flow rate, acetonitrile for the poor solvent in the mobile phase, and THF for the good solvent. 0.02 g of the THF-soluble matter yielded by the extraction is dissolved in 1.5 mL of THF and this is used as the sample for separation. A composition with 100% acetonitrile is used for the starting mobile phase; then, when 5 minutes have elapsed after sample injection, the percentage of THF is increased by 4% each minute; and the mobile phase composition at 25 minutes is 100% THF. Components can be separated by drying the obtained fractions to solidification. The polyester resin can thereby be obtained. Which fraction components are the polyester resin can be determined by measurement of the $^{13}C$-NMR measurement as described below.

Method for Calculating the Ester Bond Content

The ester bond content in the polyester resin is calculated proceeding as follows using $^{13}C$-NMR. The measurement conditions are as follows.

Instrument: AVANCE-600 FT-NMR, Bruker

Sample size: 150 mg

Measurement temperature: room temperature

Measurement method: inversed-gated decoupling

Solvent: 0.75 mL deuterochloroform

Relaxation reagent: chromium(III) acetylacetonate

Number of scans: 30000

Quantitation is performed by the internal reference method using the peak area appearing at 160.0 to 170.0 ppm, which originates with the ester bond.

Measurement of the Silicon Concentration in the Silicon-Containing Polyester Resin An "Axios" wavelength-dispersive x-ray fluorescence analyzer (PANalytical B.V.) is used for the silicon atom content in the polyester resin. The "SuperQ ver. 4.0F" (PANalytical B.V.) software provided therewith is used in order to set the measurement conditions and analyze the measurement data. Rh is used for the x-ray tube anode, and 24 kV and 100 mA are used, respectively, for the acceleration voltage and current.

A vacuum is used for the measurement atmosphere; 27 mm is used for the measurement diameter (collimator diameter); and 10 seconds is used for the measurement time. A proportional counter (PC) is used for the detector. The measurement is carried out using PET for the analyzing crystal; the count rate (unit: cps) of Si—Kα radiation observed at a diffraction angle (2θ)=109.08° is measured; and the determination is made using a calibration curve as described in the following.

The polyester resin may be used as such as the measurement sample, or the polyester resin extracted from the toner particle using the aforementioned extraction method may be used as the measurement sample.

A "BRE-32" tablet compression molder (Maekawa Testing Machine Mfg. Co., Ltd.) is used to obtain the measurement pellet. 4 g of the measurement sample is introduced into a specialized aluminum compaction ring and is smoothed over, and a pellet is produced by molding to a thickness of 2 mm and a diameter of 39 mm by compression for 60 seconds at 20 MPa, and this pellet is used as the measurement pellet.

With regard to the pellets for construction of the calibration curve for the determination of content, $SiO_2$ (hydrophobic fumed silica) [product name: AEROSIL NAX50, specific surface area: 40±10 ($m^2/g$), carbon content: 0.45 to 0.85%, from Nippon Aerosil Co., Ltd.] is added at 0.5 mass parts per 100 mass parts of a binder [product name: Spectro Blend, components: C 81.0, O 2.9, H 13.5, N 2.6 (mass %), chemical formula: $C_{19}H_{38}ON$, form: powder (44 μm), from the Rigaku Corporation]; thorough mixing is performed in a coffee mill; and a pellet is prepared by pellet molding. The same mixing and pellet molding procedure is used to prepare pellets using the $SiO_2$ at 5.0 mass parts and 10.0 mass parts, respectively.

A calibration curve in the form of a linear function is obtained by placing the obtained x-ray count rate on the vertical axis and the Si addition concentration for each calibration curve sample on the horizontal axis. The count rate for Si—Kα radiation is then also measured for the measurement sample using the same procedure. The silicon atom content (mass %) is determined from the calibration curve that has been prepared.

Measurement of the Weight-Average Molecular Weight Mw of the Resins, e.g., Polyester Resin The weight-average molecular weight (Mw) of the polymer, resin or toner particle are measured as follows using gel permeation chromatography (GPC). First, the sample is dissolved in tetrahydrofuran (THF) for 24 hours at room temperature. The obtained solution is filtered using a "Sample Pretreatment Cartridge" (Tosoh Corporation) solvent-resistant membrane filter having a pore diameter of 0.2 μm to obtain a sample solution. The sample solution is adjusted to a concentration of THF-soluble component of approximately 0.8 mass %. Measurement is carried out under the following conditions using this sample solution.

- instrument: HLC8120 GPC (detector: RI) (Tosoh Corporation)
- column: 7-column train of Shodex KF-801, 802, 803, 804, 805, 806, and 807 (Showa Denko Kabushiki Kaisha)
- eluent: tetrahydrofuran (THF)
- flow rate: 1.0 mL/min
- oven temperature: 40.0° C.
- amount of sample injection: 0.10 mL A molecular weight calibration curve constructed using polystyrene resin standards (product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample.

EXAMPLES

The present disclosure is more specifically described in the following using production examples and examples, but the invention is in no way limited to or by these. Unless specifically indicated otherwise, the "parts" and "%" given in the examples and comparative examples are on a mass basis in all instances.

Production of External Additive Core 1

Preparation of Aqueous Phase 50.0 parts of deionized water is introduced into a #11 mayonnaise bottle and 0.2 parts of sodium lauryl sulfate is dissolved.

Preparation of Oil Phase 3.0 parts of HNP-9 (Nippon Seiro Co., Ltd.) as core material is dissolved in 7.0 parts of toluene. The oil phase is added to the stirred aqueous phase and dispersion is carried out for 5 minutes using an ultrasound homogenizer (intermittent, irradiation for 1 s, stop for 1 s). The toluene was removed using an evaporator followed by removal of the excess sodium lauryl sulfate using an ultrafiltration filter to obtain an aqueous dispersion of external additive core 1. The external additive core 1 had a maximum Feret diameter of 110 nm and a kinematic viscosity at 110° C. of 7 $mm^2/s$.

Production of External Additive Core 2

5.0 parts of HNP-9 and 10.0 parts of methyl ethyl ketone (MEK) were introduced into a reactor fitted with a stirrer, condenser, thermometer, and nitrogen introduction line and dissolution was carried out with heating to 50° C. 0.45 parts of triethylamine was then added while stirring. After confirming that the crystalline material had thoroughly dissolved, a fine particle dispersion (solids fraction concentration of 9.0 mass %) was obtained by phase inversion emulsification brought about by the dropwise addition of 40 parts of water at a rate of 2.5 parts/minute. The MEK was thoroughly distilled off at 60° C. using an evaporator to obtain an aqueous dispersion of external additive core 2. The external additive core 2 had a maximum Feret diameter of 12 nm and a kinematic viscosity at 110° C. of 7 $mm^2/s$.

Production of External Additive Cores 3, 5 to 8, and 11

Aqueous dispersions of external additive cores 3, 5 to 8, and 11 were obtained proceeding as in the Production of External Additive Core 1, but changing the core material and dispersion time as shown in Table 1. The maximum Feret diameter and the kinematic viscosity at 110° C. are given in Table 1. Sasol C105 is from Sasol Limited, and DP-18 is a pentaerythritol stearate ester wax from The Nisshin OilliO Group, Ltd.

Production of External Additive Core 4

Preparation of Aqueous Phase 50.0 parts of deionized water is introduced into a #11 mayonnaise bottle and 0.2 parts of sodium lauryl sulfate is dissolved.

Preparation of Oil Phase 3.0 parts of Sanwax 161-P (Sanyo Chemical Industries, Ltd.) as core material was dissolved in 7.0 parts of toluene. The oil phase was added to the stirred aqueous phase, and dispersion was carried out for 5 minutes at 12,000 rpm using a T.K. Homomixer (Tokushu Kika Kogyo Co., Ltd.). The toluene was then removed using an evaporator followed by removal of the excess sodium lauryl sulfate using an ultrafiltration filter to yield an aqueous dispersion of external additive core 4. The external additive core 4 had a maximum Feret diameter of 310 nm and a kinematic viscosity at 110° C. of 20 $mm^2/s$.

Production of External Additive Core 9

An aqueous dispersion of external additive core 9 was obtained proceeding as in the Production of External Additive Core 4, but changing the core material as shown in Table 1. The external additive core 9 had a maximum Feret diameter of 450 nm and a kinematic viscosity at 110° C. of 7 $mm^2/s$.

Production of External Additive Core 10

An aqueous dispersion of external additive core 10 was obtained proceeding as in the Production of External Additive Core 2, but changing the core material to CW (The Nisshin OilliO Group, Ltd., behenyl behenate). The external additive core 10 had a maximum Feret diameter of 50 nm and a kinematic viscosity at 110° C. of 48 $mm^2/s$.

Production of External Additive Core 12

150 parts of a 1.5% aqueous solution of Neogen RK (Dai-ichi Kogyo Seiyaku Co., Ltd.) was added to an oil phase of 78.0 parts of styrene mixed with 22.0 parts of butyl acrylate and dispersion was carried out. An aqueous solution of 0.3 parts of potassium persulfate in 10.0 parts of deionized water was also added while gently stirring for 10 minutes. After nitrogen substitution had been carried out, an emulsion polymerization was run for 6 hours at 70° C. After the completion of polymerization, the reaction solution was cooled to room temperature and deionized water was added to yield an aqueous dispersion of external additive core 12 having a solids fraction concentration of 12.5 mass %. The external additive core 12 had a maximum Feret diameter of 390 nm and a kinematic viscosity at 110° C. of 380 mm 2/s.

Production of External Additive Core 13

An aqueous dispersion of external additive core 13 was obtained proceeding as in the Production of External Additive Core 2, but changing the core material as shown in Table 1. The maximum Feret diameter and kinematic viscosity at 110° C. are given in Table 1.

Production of External Additive Core 14

An aqueous dispersion of external additive core 14 was obtained proceeding as in the Production of External Additive Core 4, but changing the core material and dispersion time as shown in Table 1. The maximum Feret diameter and kinematic viscosity at 110° C. are given in Table 1.

Production of External Additive 1

The solid/liquid ratio was first measured for the aqueous dispersion of external additive core 1 by drying to solidity, and an amount of the aqueous dispersion of external additive core 1 corresponding to 7.0 parts external additive core 1 solids fraction was then taken off. To this were added 4.0 parts of methyltrimethoxysilane as shell material and deionized water to make a total amount of 500.0 parts, and this was then introduced into a stirrer-equipped mixing vessel. The pH of this was adjusted to 9.6 using an aqueous sodium bicarbonate solution, and stirring was carried out for 5 hours at room temperature to obtain a dispersion of an external additive 1 on which an organosilicon polymer shell has been formed. Upon checking the core-shell structure of the external additive by TEM-EDX, a core-shell structure was seen in which an organosilicon polymer shell was formed on the surface of the external additive core. The maximum Feret diameter was 150 nm, Tm was 74° C., and Tm-Tc was 10° C.

Production of External Additives 2 to 11 and 13 to 15

Dispersions of external additives 2 to 11 and 13 to 15 were obtained proceeding as in the Production of External Additive 1, but changing the external additive core, the shell material, and the number of parts of the shell as shown in Table 2. Upon checking the core-shell structure of the external additives by TEM-EDX, core-shell structures were seen in which an organosilicon polymer shell was formed on the surface of the external additive core. The maximum Feret diameter, Tm, and Tm-Tc are given in Table 2.

Production of External Additive 12

The solid/liquid ratio was measured for the aqueous dispersion of external additive core 3 by drying to solidity, and an amount of the aqueous dispersion of external additive core 3 corresponding to 7.0 parts external additive core 3 solids fraction was then taken off. To this aqueous dispersion was added deionized water to make a total amount of 50.0 parts. The pH of this dispersion was measured and the pH was adjusted to 2.0 by the addition of 10 mass % hydrochloric acid.

2.5 parts of 3-methacryloxypropyltrimethoxysilane was then added as shell material, and this was introduced into a stirrer-equipped mixing vessel. After heating for 30 minutes at 65° C., 0.25 parts of a 10 mass % aqueous solution of potassium persulfate (KPS) was added and heating was carried out for 3 hours at 80° C. This was followed by cooling and drying to obtain a dispersion of external additive 12. Upon checking the core-shell structure of the external additive by TEM-EDX, a core-shell structure was seen in which an organosilicon polymer shell was formed on the surface of the external additive core. The maximum Feret diameter was 440 nm, and a Tm and Tc were not identified.

Production of Toner Particle Dispersion 1

Synthesis of Polyester Resin 1

Polyester resin 1 was synthesized using the following procedure. The following materials were introduced into an autoclave fitted with a pressure reduction apparatus, water separation apparatus, nitrogen gas introduction apparatus, temperature measurement apparatus, and stirring apparatus and a reaction was run for 5 hours at 200° C. and normal pressure under a nitrogen atmosphere.

2.0 mol propylene oxide adduct on bisphenol A: 77.4 parts
Terephthalic acid: 15.8 parts
Isophthalic acid: 15.8 parts
Tetrabutoxytitanate: 0.2 parts This was followed by the addition of the following materials and reaction for 3 hours at 220° C.

Trimellitic acid: 0.1 parts
Tetrabutoxytitanate: 0.3 parts

The reaction was carried out for an additional 2 hours under a reduced pressure of 10 to 20 mmHg. The obtained resin was dissolved in chloroform; this solution was added dropwise into ethanol to perform reprecipitation; and a polyester resin 1 was then obtained by filtration. The obtained polyester resin 1 had Mw=10200.

Synthesis of Polyester Resin 2

A polyester resin 2 was obtained proceeding as in the Synthesis of Polyester Resin 1, but changing the trimellitic acid to 1.0 parts. The obtained polyester resin 2 had Mw=19500.

Synthesis of Silicon-Containing Polyester Resin

A silicon-containing polyester resin was synthesized using the following procedure. The silicon-containing polyester resin was synthesized as follows by carrying out an amidation between the carboxy groups in the polyester resin 2 and the amino group in an aminosilane. 100.0 parts of polyester resin 2 was dissolved in 400.0 parts of N,N-dimethylacetamide and the following materials were added and stirring was performed for 5 hours at normal temperature. After the completion of the reaction, the solution was added dropwise to methanol to carry out reprecipitation, and the silicon-containing polyester resin was obtained by filtration.

Silane compound: 3-aminopropyltrimethoxysilane: 1.2 parts

Condensing agent: DMT-MM (4-(4,4-dimethoxy-1,3,5-triazin-2-yl)-4-methylmorpholinium chloride): 2.4 parts The obtained silicon-containing polyester resin had a silicon concentration of mass % and an Mw of 19700.

Production of Aqueous Medium 1

390.0 parts of deionized water and 14.0 parts of sodium phosphate (dodecahydrate) (RASA Industries, Ltd.) were introduced into a reactor and the temperature was held at 65° C. for 1.0 hour while purging with nitrogen. An aqueous calcium chloride solution of 9.2 parts of calcium chloride (dihydrate) dissolved in 10.0 parts of deionized water was introduced all at once while stirring at 12,000 rpm using a T.K. Homomixer (Tokushu Kika Kogyo Co., Ltd.) to prepare an aqueous medium containing a dispersion stabilizer. 10% hydrochloric acid was introduced into this aqueous medium to adjust the pH to 6.0 and provide aqueous medium 1.

Polymerizable Monomer Composition 1 Production

Styrene 60.0 parts

Colorant (C.I. Pigment Blue 15:3) 6.5 parts

These materials were introduced into an attritor (Nippon Coke & Engineering Co., Ltd.) and dispersion was carried out for 5.0 hours at 220 rpm using zirconia particles with a diameter of 1.7 mm to prepare a dispersion 1 in which the colorant was dispersed.

The following materials were added to this dispersion 1.

| | |
|---|---|
| Styrene | 20.0 parts |
| n-butyl acrylate | 20.0 parts |
| Silicon-containing polyester resin | 1.0 parts |
| Polyester resin 1 | 7.0 parts |

This was then held at 65° C. and a polymerizable monomer composition 1 was prepared by dissolving and dispersing to uniformity at 500 rpm using a T.K. Homomixer.

Granulation Step

While holding the temperature of aqueous medium 1 at 70° C. and the stirrer rotation rate at 12,000 rpm, the polymerizable monomer composition 1 was introduced into the aqueous medium 1 and 9.0 parts of the polymerization initiator t-butyl peroxypivalate was added. Granulation was performed for 10 minutes while maintaining 12,000 rpm with the stirrer.

Polymerization Step

The high-speed stirrer was replaced with a stirrer equipped with a propeller impeller and polymerization was carried out for 5.0 hours while maintaining 70° C. and stirring at 150 rpm. An additional polymerization reaction was run by raising the temperature to 85° C. and heating for 2.0 hours to obtain toner particle dispersion 1.

Production of Toner Particle Dispersion 2

A toner particle dispersion 2 was produced proceeding as in the Production of Toner Particle Dispersion 1, but changing the silicon-containing polyester resin to 0 parts.

Production of Toner Particle Dispersion 3

Production of Resin Particle Dispersion 1

The following materials were weighed out and mixed and dissolved.

Styrene 82.6 parts n-butyl acrylate 9.2 parts

Acrylic acid 1.3 parts

Hexanediol diacrylate 0.4 parts n-lauryl mercaptan 3.2 parts

A 10% aqueous solution of Neogen RK (Dai-ichi Kogyo Seiyaku Co., Ltd.) was added to the resulting solution and dispersion was carried out. An aqueous solution of 0.15 parts of potassium persulfate dissolved in 10.0 parts of deionized water was added while gently stirring for 10 minutes. After substitution with nitrogen, an emulsion polymerization was run for 6.0 hours at a temperature of 70° C. After completion of the polymerization, the reaction solution was cooled to room temperature and deionized water was added to yield a resin particle dispersion 1 having a solids fraction concentration of 12.5% and a median diameter on a volume basis of 0.2 μm.

Colorant Particle Dispersion Production

The following materials were weighed out and mixed.

Colorant (C.I. Pigment Blue 15:3) 100.0 parts

Neogen RK (Dai-ichi Kogyo Seiyaku Co., Ltd.) 15.0 parts

Deionized water 885.0 parts

These materials were dispersed for 1 hour using a JN100 wet jet mill (Jokoh Co., Ltd.) to yield a colorant particle dispersion.

Aggregate Particle Formation

| | |
|---|---|
| Resin particle dispersion 1 | 160.0 parts |
| Colorant particle dispersion | 10.0 parts |
| Magnesium sulfate | 0.2 parts |

These materials were dispersed using a homogenizer (Ultra-Turrax T50, IKA), followed by heating to 65° C. while stirring. After stirring for 1.0 hour at 65° C. had been carried out, 20.0 parts of resin particle dispersion 1 was added and stirring was carried out for an additional 0.2 hours. Observation with an optical microscope confirmed the formation of aggregate particles having a number-average particle diameter of 7.0 μm. To this was then added 2.2 parts of Neogen RK (Dai-ichi Kogyo Seiyaku Co., Ltd.), followed by heating to 80° C. and stirring for 2.0 hours to obtain a fused spherical toner particle dispersion 3.

Toner Particle 4 Preparation

The following materials were introduced into a reactor fitted with a condenser, stirrer, and nitrogen introduction line.

Terephthalic acid 29.0 parts

Polyoxypropylene(2.2)-2,2-bis(4-hydroxyphenyl)propane 80.0 parts

Titanium dihydroxybis(triethanolaminate) 0.1 parts

This was followed by heating to 200° C. and reaction for 9 hours while introducing nitrogen and removing the evolved water. 5.8 parts trimellitic anhydride was then added; heating to 170° C. was carried out; and a reaction was run for 3 hours to synthesize a polyester resin 3 for use as a binder resin.

Low-density polyethylene (melting point: 100° C.) 20.0 parts

Styrene 64.0 parts n-butyl acrylate 13.5 parts

Acrylonitrile 2.5 parts

These materials were introduced into an autoclave and the interior was substituted with nitrogen and holding at 180° C. was then carried out while heating and stirring. 50.0 parts of a 2.0% xylene solution of t-butyl hydroperoxide was continuously added dropwise to the system over 4.5 hours, and, after cooling, the solvent was separated and removed to obtain a graft polymer of a copolymer (styrene, n-butyl acrylate, and acrylonitrile copolymer) grafted to polyethylene.

| | |
|---|---|
| Polyester resin 3 | 100.0 parts |
| Graft polymer | 5.0 parts |
| C. I. Pigment Blue 15:3 | 5.0 parts |

These materials were thoroughly mixed using an FM mixer (Model FM-75, Nippon Coke & Engineering Co., Ltd.) followed by melt-kneading with a twin-screw kneader (Model PCM-30, Ikegai Ironworks Corporation) set to a temperature of 100° C. The resulting kneaded material was cooled and was coarsely pulverized to 1 mm and below using a hammer mill to yield a coarse pulverizate. Then, a finely pulverized material of about 5 μm was obtained from this coarse pulverizate using a Turbo Mill from Turbo Kogyo Co., Ltd. (T-250: RSS rotor/SNB liner). The fines and coarse powder were subsequently cut using a Coanda effect-based multi-grade classifier to obtain a toner particle 4.

Production of Toner Particle Dispersion 5

The solid/liquid ratio was measured by drying the toner particle dispersion 1 to solidity, and an amount of the toner particle dispersion 1 corresponding to 100 parts of the solids fraction was then taken off. This was heated to 55° C., and, while mixing using a propeller impeller, the pH of the mixture is adjusted to 5.6 using hydrochloric acid or a sodium bicarbonate solution. 2.8 parts of methyltrimethoxysilane was added to this with stirring, and the pH was adjusted to 9.6 using an aqueous sodium bicarbonate solution. After holding with stirring for 4 hours at 55° C., air cooling then yielded a toner particle dispersion 5.

Production of Toner Particle Dispersion 6

A toner particle dispersion 6 was produced proceeding as in the Production of Toner Particle Dispersion 1, but changing the silicon-containing polyester resin (1.0 parts) to HNP-9 (7.0 parts).

Toner 1 Production

The solid/liquid ratio was measured by drying the toner particle dispersion 1 to solidity, and an amount of the toner particle dispersion 1 corresponding to 100.0 parts of the solids fraction was then taken off. The solid/liquid ratio was then measured by drying the external additive 1 dispersion to solidity; external additive 1 dispersion corresponding to 5.0 parts of the solids fraction was added to the toner particle dispersion 1; and heating to 55° C. was carried out. While mixing using a propeller impeller, the pH of the mixture was adjusted to 5.6 using hydrochloric acid or a sodium bicarbonate solution; holding at 100° C. for 1 hour with stirring was carried out; and this was followed by air cooling. The pH was then adjusted to 1.5 with 1 mol/L hydrochloric acid, stirring was carried out for 1 hour, and then filtration while washing with deionized water yielded toner 1. Evaluation of the resulting toner 1 by TOF-SIMS was able to confirm that the carbon atom and silicon atom were present at the toner particle surface.

Toner 2 Production

A toner 2 was obtained proceeding as in Toner 1 Production, but changing the toner particle dispersion 1 to toner particle dispersion 5 and changing the external additive 1 dispersion to the external additive 2 dispersion. Evaluation of the resulting toner 2 by TOF-SIMS was able to confirm that the carbon atom and silicon atom were present at the toner particle surface.

Toners 3 to 6, 10, and 11 and Comparative Toners 1 to 4 Production

Toners 3 to 6, 10, and 11 and comparative toners 1 to 4 were obtained proceeding as in Toner 1 Production, but changing the toner particle dispersion and external additive dispersion in accordance with Table 3.

Toner 7 Production

The solid/liquid ratio was measured by drying the toner particle dispersion 3 to solidity, and an amount of the toner particle dispersion 3 corresponding to 100.0 parts of the solids fraction was then taken off. The solid/liquid ratio was subsequently measured by drying the external additive 7 dispersion to solidity and external additive 7 dispersion corresponding to 5.0 parts of the solids fraction was added; and heating to 55° C. was carried out. While mixing using a propeller impeller, the pH of the mixture was adjusted to 5.6 using hydrochloric acid or a sodium bicarbonate solution; holding at 100° C. for 1 hour with stirring was carried out; and this was followed by air cooling. Filtration was subsequently carried out, and the filtered-off solid was washed by stirring for 1.0 hour with 720.0 parts of deionized water. The toner-containing solution was filtered and drying was performed using a vacuum dryer to obtain toner 7.

Toner 8 Production

A powder of external additive 8 was obtained by carrying out filtration on the external additive 8 dispersion while washing with deionized water and then vacuum drying. Using 1.0 parts of the external additive 8 powder per 100 parts of the powder of toner particle 4, mixing was performed for 5 minutes using a Henschel mixer (Mitsui Miike Chemical Engineering Machinery Co., Ltd.) to obtain a toner 8. The jacket temperature on the Henschel mixer was set to 10° C., and the peripheral velocity of the rotating blades was 38 msec.

Toner 9 Production

A powder of external additive 9 was obtained by carrying out filtration on the external additive 9 dispersion while washing with deionized water and then vacuum drying. The pH of the toner particle dispersion 2 was then adjusted to 1.5 with 1 mol/L hydrochloric acid; stirring was carried out for 1 hour; and filtration was then performed while washing with deionized water to obtain a toner particle 2. Using 1.0 parts of the external additive 9 powder per 100 parts of toner particle 2, mixing was performed for 5 minutes using a Henschel mixer (Mitsui Miike Chemical Engineering Machinery Co., Ltd.) to obtain a toner 9. The jacket temperature on the Henschel mixer was set to and the peripheral velocity of the rotating blades was 38 msec.

Evaluation of Image Streaks After Durability Testing

Image streaks are approximately 0.5 mm vertical streaks that are produced when a core-shell external additive is deformed, resulting in exposure of the interior release agent and contamination of members by this release agent. Image streaks are image defects that are readily observed when a whole-side halftone image is output. A modified version of an LBP712Ci (Canon, Inc.) was used as the image-forming machine. The process speed at the main unit was modified to 250 mm/sec. The adjustments required to enable image formation under this condition were also made. The toners were removed from the black and cyan cartridges, and 50 g of the toner undergoing evaluation was filled as a replacement into each. The toner laid-on level was made 1.0 mg/cm$^2$.

Image streaking was evaluated during continuous use in a normal-temperature, normal-humidity environment (23° C., 60% RH). XEROX 4200 paper (Xerox Corporation, 75 g/m$^2$) was used as the evaluation paper. While operating in the normal-temperature, normal-humidity environment, 15000 prints were made, using an intermittent continuous operation of 2 prints output each 4 seconds, of an E character image having a print percentage of 1%; this was followed by the output of a whole-side 50% halftone image and observation of the presence/absence of streaks. The results of this evaluation were designated as image streaks after durability testing (durability testing streaking). A score of A to C was regarded as good. The results of the evaluation are given in Table 4.

Evaluation Criteria

A: Streaks and toner clumps are not produced.

B: There are no speckled streaks, but there are small toner clumps in 1 or 2 locations.

C: There are 1 or 2 speckled streaks at the ends, or there are small toner clumps at 3 or 4 locations.

D: There are 1 or 2 speckled streaks over the whole side, or there are small toner clumps at 5 or 6 locations.

E: There are 3 or more speckled streaks over the whole side, or there are small toner clumps at 7 or more locations.

Evaluation of Fixing Wrapround

The same image-forming machine as in the evaluation of image streaks was modified to enable adjustment of the fixation temperature. GF-600 (60 g/$m^2$, Canon Marketing Japan Inc.) was used as the evaluation paper. The output image was a whole-side solid image, and the evaluation was carried out in a normal-temperature, normal-humidity environment (23° C., 60% RH). Fixing of the toner to be evaluated was carried out with the fixation temperature being varied in 5° C. steps from 140° C., and the status of paper passage was visually evaluated during this. The fixing wraparound was evaluated based on the following criteria from the temperature of the fixing unit when paper passage proceeded without the occurrence of wraparound. The results of the evaluation are given in Table 4.

A: Less than 150° C.

B: Equal to or greater than 150° C. and less than 155° C.

C: Equal to or greater than 155° C. and less than 160° C.

D: Equal to or greater than 160° C. and less than 170° C.

E: 170° C. or above

Evaluation of Fogging After Durability Testing

Using the same image-forming machine as in the evaluation of image streaks, fogging after continuous use was evaluated in a normal-temperature, normal-humidity environment (23° C., 60% RH). XEROX 4200 paper (Xerox Corporation, 75 g/$m^2$) was used as the paper in the durability testing. While operating in the normal-temperature, normal-humidity environment, 15000 prints were made, using an intermittent continuous operation of 2 prints output each 4 seconds, of an E character image having a print percentage of 1%.

After this, a solid white image with a print percentage of 0% was printed out in glossy paper mode (⅓ speed) using letter-size HP Brochure Paper 200 g, Glossy (areal weight of 200 g/$m^2$) as the evaluation paper. The whiteness of a white background region of the solid white image and the whiteness of the transfer paper were measured using a “Reflectometer Model TC-6DS” (Tokyo Denshoku Co., Ltd.). The image fogging (durability testing fogging) was evaluated using the fogging density (%) for the difference between these whiteness values. An amber filter was used for the filter. A better evaluation is indicated by smaller numerical values. The evaluation criteria are as follows. A score of A to C was regarded as good. The results of the evaluation are given in Table 4.

Evaluation Criteria

A: Less than 1.0%

B: Equal to or greater than 1.0% and less than 2.0%

C: Equal to or greater than 2.0% and less than 3.0%

D: Equal to or greater than 3.0% and less than 4.0%

E: Equal to or greater than 4.0%

Evaluation of the Charge Rise Performance in a High-Temperature, High-Humidity Environment The following evaluation was performed in a high-temperature, high-humidity environment (30° C., 80% RH). 19.0 g of F813-300 magnetic carrier (Powdertech Co., Ltd.) and 1.0 g of the toner to be evaluated were introduced into a lidded 50-mL plastic bottle; two of these were prepared. Shaking was performed for 2 minutes and 10 minutes, respectively, at a speed of 4 roundtrips per second using a shaker (YS-LD, Yayoi Co., Ltd.) to prepare two-component developers.

0.200 g of the two-component developer for measurement of the triboelectric charge amount is introduced into a metal measurement container 2 having a 500-mesh screen 3 (25 μm aperture) at the bottom, as shown in the FIGURE, and a metal lid 4 is applied. The mass of the entire measurement container 2 at this point is measured to give W1 (g). Suction is then drawn through a suction port 7 with a suction device 1 (the part in contact with the measurement container 2 is at least an insulator), and the pressure at a vacuum gauge 5 is brought to 50 mmAq by adjustment with an airflow control valve 6. The toner is suctioned and removed in this state for 1 minute. The potential at an electrometer 9 at this point is indicated in volts (V). Here, 8 is a capacitor, and the capacitance is C (μF). The mass of the overall measurement container after suction is measured to give W2 (g). The triboelectric charge amount on the toner is calculated using the following formula.

$$\text{triboelectric charge amount (mC/kg)}=(C\times V)/(W1-W2)$$

The value of “[triboelectric charge amount after shaking for 2 minutes”/“triboelectric charge amount after shaking for 10 minutes]×100” was calculated, and this result was taken to be the charge rise performance and was evaluated using the following criteria. The results of the evaluation are given in Table 4.

A: the charge rise performance is at least 90%

B: the charge rise performance is at least 80%, but less than 90%

C: the charge rise performance is at least 70%, but less than 80%

D: the charge rise performance is at least 60%, but less than 70%

E: the charge rise performance is less than 60%

TABLE 1

| External additive core No. | External additive core: Core material | Number of parts of material | Dispersion time (min) | Core production method | Maximum Feret diameter | Kinematic viscosity (110° C.) $mm^2$/s |
|---|---|---|---|---|---|---|
| 1 | HNP-9 | 3.0 | 5.0 | Ultrasound emulsification | 110 nm | 7 |
| 2 | HNP-9 | 5.0 | — | Phase inversion emulsification | 12 nm | 7 |

TABLE 1-continued

| External additive core No. | External additive core: Core material | Number of parts of material | Dispersion time (min) | Core production method | Maximum Feret diameter | Kinematic viscosity (110° C.) $mm^2/s$ |
|---|---|---|---|---|---|---|
| 3 | Sasol C105 | 3.0 | 4.0 | Ultrasound emulsification | 210 nm | 16 |
| 4 | Sanwax 161-P | 3.0 | 5.0 | Shear emulsification | 310 nm | 20 |
| 5 | HNP-9 | 3.0 | 10.0 | Ultrasound emulsification | 80 nm | 7 |
| 6 | HNP-9 | 3.0 | 9.0 | Ultrasound emulsification | 90 nm | 7 |
| 7 | HNP-9 | 3.0 | 7.0 | Ultrasound emulsification | 100 nm | 7 |
| 8 | HNP-9 | 3.0 | 4.0 | Ultrasound emulsification | 160 nm | 7 |
| 9 | HNP-9 | 3.0 | 5.0 | Shear emulsification | 450 nm | 7 |
| 10 | CW | 5.0 | — | Phase inversion emulsification | 50 nm | 48 |
| 11 | DP-18 | 3.0 | 10.0 | Ultrasound emulsification | 70 nm | 61 |
| 12 | Styrene-acrylic resin | — | — | Emulsion polymerization | 390 nm | 380 |
| 13 | HNP-9 | 4.5 | — | Phase inversion emulsification | 10 nm | 7 |
| 14 | HNP-9 | 3.0 | 4.5 | Shear emulsification | 480 nm | 7 |

TABLE 2

| External additive No. | External additive core No. | External additive shell: Shell material | Number of parts of shell | Maximum Feret diameter | Tm | Tm-Tc |
|---|---|---|---|---|---|---|
| 1 | 1 | Methyltrimethoxysilane | 4.0 | 150 nm | 74° C. | 10° C. |
| 2 | 2 | Methyltrimethoxysilane | 7.5 | 20 nm | 74° C. | 11° C. |
| 3 | 3 | Methyltrimethoxysilane | 2.5 | 250 nm | 103° C. | 11° C. |
| 4 | 4 | Methyltrimethoxysilane | 1.5 | 350 nm | 109° C. | 9° C. |
| 5 | 5 | n-propyltrimethoxysilane | 6.0 | 120 nm | 74° C. | 11° C. |
| 6 | 6 | Hexyltrimethoxysilane | 5.0 | 130 nm | 74° C. | 12° C. |
| 7 | 7 | Phenyltriethoxysilane | 4.5 | 140 nm | 74° C. | 9° C. |
| 8 | 8 | Methyltrimethoxysilane | 4.5 | 200 nm | 74° C. | 10° C. |
| 9 | 9 | Octyltriethoxysilane | 1.0 | 490 nm | 74° C. | 13° C. |
| 10 | 10 | Octyltriethoxysilane | 5.0 | 70 nm | 71° C. | 5° C. |
| 11 | 11 | Decyltrimethoxysilane | 6.5 | 110 nm | 77° C. | 6° C. |
| 12 | 3 | 3-methacryloxypropyltrimethoxysilane | 2.5 | 250 nm | 103° C. | 0° C. |
| 13 | 12 | Methyltrimethoxysilane | 1.5 | 440 nm | — | — |
| 14 | 13 | Methyltrimethoxysilane | 5.0 | 15 nm | 74° C. | 10° C. |
| 15 | 14 | Methyltrimethoxysilane | 1.0 | 520 nm | 74° C. | 10° C. |

TABLE 3

| | External additive | Toner particle | Feret diameter nm | RT3/S | Presence/absence of silicon and carbon |
|---|---|---|---|---|---|
| Toner 1 | Dispersion of external additive 1 | Toner particle dispersion 1 | 150 | 0.95 | Present |
| Toner 2 | Dispersion of external additive 2 | Toner particle dispersion 5 | 20 | 0.94 | Present |
| Toner 3 | Dispersion of external additive 3 | Toner particle dispersion 2 | 250 | 0.96 | Absent |
| Toner 4 | Dispersion of external additive 4 | Toner particle dispersion 2 | 350 | 0.94 | Absent |
| Toner 5 | Dispersion of external additive 5 | Toner particle dispersion 2 | 120 | 0.85 | Absent |
| Toner 6 | Dispersion of external additive 6 | Toner particle dispersion 2 | 130 | 0.82 | Absent |
| Toner 7 | Dispersion of external additive 7 | Toner particle dispersion 3 | 140 | 0.80 | Absent |
| Toner 8 | external additive 8 | Toner particle 4 | 200 | 0.93 | Absent |
| Toner 9 | external additive 9 | Toner particle 2 | 490 | 0.77 | Absent |
| Toner 10 | Dispersion of external additive 10 | Toner particle dispersion 2 | 70 | 0.78 | Absent |
| Toner 11 | Dispersion of external additive 11 | Toner particle dispersion 2 | 110 | 0.67 | Absent |

TABLE 3-continued

| | External additive | Toner particle | Feret diameter nm | RT3/S | Presence/absence of silicon and carbon |
|---|---|---|---|---|---|
| Comparative toner 1 | Dispersion of external additive 12 | Toner particle dispersion 2 | 250 | 0.71 | Absent |
| Comparative toner 2 | Dispersion of external additive 13 | Toner particle dispersion 6 | 440 | 0.94 | Absent |
| Comparative toner 3 | Dispersion of external additive 14 | Toner particle dispersion 2 | 15 | 0.96 | Absent |
| Comparative toner 4 | Dispersion of external additive 15 | Toner particle dispersion 2 | 520 | 0.95 | Absent |

In the table, the Feret diameter is the maximum Feret diameter of the core-shell particle. With regard to the presence/absence of silicon and carbon, the detection of the carbon atom and silicon atom at the toner particle surface by TOF-SIMS analysis is indicated by "present", while the absence of detection is indicated by "absent".

TABLE 4

| | Image streaks after durability testing | | | Fixing wraparound | | Fogging after durability testing | | Charge rise at high-temperature and high-humidity | |
|---|---|---|---|---|---|---|---|---|---|
| | Number of streaks | Number of toner clumps | Rank | Temperature without wraparound | Rank | Fogging % | Rank | Charge rise performance | Rank |
| Toner 1 | 0 | 0 | A | 140° C. | A | 0.3% | A | 96% | A |
| Toner 2 | 0 | 0 | A | 145° C. | A | 0.6% | A | 94% | A |
| Toner 3 | 0 | 1 | B | 145° C. | A | 0.7% | A | 89% | B |
| Toner 4 | 0 | 1 | B | 145° C. | A | 0.5% | A | 85% | B |
| Toner 5 | 0 | 0 | A | 140° C. | A | 1.1% | B | 87% | B |
| Toner 6 | 0 | 0 | A | 145° C. | A | 1.8% | B | 81% | B |
| Toner 7 | 0 | 2 | B | 145° C. | A | 1.6% | B | 80% | B |
| Toner 8 | 0 | 1 | B | 145° C. | A | 0.9% | A | 82% | B |
| Toner 9 | 0 | 2 | B | 145° C. | A | 2.1% | C | 86% | B |
| Toner 10 | 0 | 0 | A | 150° C. | B | 2.0% | C | 82% | B |
| Toner 11 | 0 | 0 | A | 150° C. | B | 2.5% | C | 80% | B |
| Comparative toner 1 | 2 over whole side | 6 | D | 160° C. | D | 3.5% | D | 75% | C |
| Comparative toner 2 | 2 at ends | 3 | C | 170° C. | E | 3.1% | D | 77% | C |
| Comparative toner 3 | 0 | 0 | A | 160° C. | D | 0.8% | A | 85% | B |
| Comparative toner 4 | 1 at end | 2 | C | 145° C. | A | 3.0% | D | 80% | B |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088684, filed May 31, 2022, which is hereby incorporated by reference herein in its entirety.

What is claimed is:

1. A core-shell particle comprising:

a core, and a shell on a surface of the core, wherein:

the core comprises a crystalline release agent;

a value of a sum of a number-average value of Feret diameter of the core-shell particle and a standard deviation of the Feret diameter of the core-shell particle is 20 to 500 nm;

the shell comprises an organosilicon polymer;

the organosilicon polymer comprises a structure given by a following formula (RT3)

$$R—SiO_{3/2} \quad (RT3)$$

wherein R in formula (RT3) represents an alkyl group having 1 to 6 carbons; and in a differential scanning calorimetric measurement of the core-shell particle, a maximum endothermic peak is present when a temperature is raised from 30° C. to 120° C. at 10.0° C./min, a maximum exothermic peak is present when the temperature is lowered from 120° C. to 30° C. at 10.0° C./min, Tm (° C.)-Tc (° C.) is 8 to 12° C., and Tm is not greater than 100° C. where Tm is a peak temperature of the maximum endothermic peak and Tc is a peak temperature of the maximum exothermic peak.

2. The core-shell particle according to claim 1, wherein, in a solid-state $^{29}$Si-NMR measurement of the organosilicon polymer, and letting RT3 be an area of a peak corresponding to the structure given by the formula (RT3) and letting S be a sum total of areas of peaks for M unit, D unit, T unit, and Q unit, a value (RT3/S) of a ratio of RT3 to S is 0.50 to 1.00, where, M unit is $(Ri)(Rj)(Rk)SiO_{1/2}$, D unit is $(Rg)(Rh)Si(O_{1/2})_2$, T unit is $RmSi(O_{1/2})_3$, and Q unit is $Si(O_{1/2})_4$, wherein Ri, Rj, Rk, Rg, Rh, and Rm represent a silicon-bonded alkyl group.

3. The core-shell particle according to claim 1, wherein the kinematic viscosity of the core at 110° C. is 1 to 60 $mm^2/s$.

4. The core-shell particle according to claim 1, wherein the organosilicon polymer is a condensation polymer of at least one organosilicon compound selected from the group consisting of organosilicon compounds having a structure given by the following formula (Z):

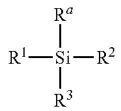

(Z)

wherein in the formula (Z), $R^a$ is an alkyl group having 1 to 6 carbons and $R^1$, $R^2$, and $R^3$ are each independently an alkoxy group having 1 to 6 carbons.

5. The core-shell particle according to claim 1, wherein the core-shell particle is an external additive for toner.

6. A core-shell particle comprising:

a core, and a shell on a surface of the core, wherein:

the core comprises a hydrocarbon wax;

a value of a sum of a number-average value of Feret diameter of the core-shell particle and a standard deviation of the Feret diameter of the core-shell particle is 20 to 500 nm;

the shell comprises an organosilicon polymer; and the organosilicon polymer comprises a structure given by a following formula (RT3)

$$R—SiO_{3/2} \quad (RT3)$$

wherein R in formula (RT3) represents an alkyl group having 1 to 6 carbons; and in a differential scanning calorimetric measurement of the core-shell particle, a maximum endothermic peak is present when a temperature is raised from 30° C. to 120° C. at 10.0° C./min, a maximum exothermic peak is present when the temperature is lowered from 120° C. to 30° C. at 10.0° C./min, and Tm (° C.)-Tc (C) is 8 to 12° C., and Tm is not greater than 100° C. where Tm is a peak temperature of the maximum endothermic peak and Tc is a peak temperature of the maximum exothermic peak.

7. The core-shell particle according to claim 6, wherein, in a solid-state $^{29}$Si-NMR measurement of the organosilicon polymer, and letting RT3 be an area of a peak corresponding to the structure given by the formula (RT3) and letting S be a sum total of areas of peaks for M unit, D unit, T unit, and Q unit, a value (RT3/S) of a ratio of RT3 to S is 0.50 to 1.00, where, M unit is $(Ri)(Rj)(Rk)SiO_{1/2}$, D unit is $(Rg)(Rh)Si(O_{1/2})_2$, T unit is $RmSi(O_{1/2})_3$, and Q unit is $Si(O_{1/2})_4$, wherein Ri, Rj, Rk, Rg, Rh, and Rm represent a silicon-bonded alkyl group.

8. A toner comprising:

a toner particle comprising a binder resin, and an external additive on a surface of the toner particle, wherein the external additive is the core-shell particle according to claim 1.

9. The toner according to claim 8, comprising carbon atoms and silicon atoms at the surface of the toner particle, as detected when the surface of the toner particle is subjected to time-of-flight secondary ion mass spectrometry.

10. The core-shell particle according to claim 1, wherein R in formula (RT3) is an alkyl group selected from the group consisting of n-propyl group, and hexyl group.

11. The core-shell particle according to claim 4, wherein $R^a$ in the formula (Z) is an alkyl group selected from the group consisting of n-propyl group, and hexyl group.

* * * * *